US008576315B2

(12) United States Patent
Kita et al.

(10) Patent No.: US 8,576,315 B2
(45) Date of Patent: Nov. 5, 2013

(54) IMAGING DEVICE AND IMAGING APPARATUS FOR PERFORMING FOCUS ALIGNMENT

(75) Inventors: Mitsuaki Kita, Kanagawa (JP); Manabu Kubo, Tokyo (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 13/249,428

(22) Filed: Sep. 30, 2011

(65) Prior Publication Data

US 2012/0147238 A1 Jun. 14, 2012

(30) Foreign Application Priority Data

Dec. 10, 2010 (JP) ................................. 2010-275201

(51) Int. Cl.
*H04N 5/335* (2011.01)
*G03B 3/00* (2006.01)

(52) U.S. Cl.
USPC ......................................... 348/302; 396/128

(58) Field of Classification Search
USPC ......................................... 348/302; 396/128
See application file for complete search history.

(56) References Cited

U.S. PATENT DOCUMENTS

2011/0096189 A1* 4/2011 Taniguchi .................. 348/222.1
2012/0038810 A1* 2/2012 Taniguchi ..................... 348/308

FOREIGN PATENT DOCUMENTS

JP 2010-220192 9/2010

OTHER PUBLICATIONS

U.S. Appl. No. 13/312,078, filed Dec. 6, 2011, Kita.

* cited by examiner

*Primary Examiner* — James Hannett
*Assistant Examiner* — Padma Haliyur
(74) *Attorney, Agent, or Firm* — Sony Corporation

(57) ABSTRACT

An imaging device including: image generation pixels generating signals for image generation; and phase difference detection pixels generating signals for focus alignment determination by phase difference detection is disclosed. The first lines where the image generation pixels are arranged in a specific direction and second lines where the phase difference detection pixels are arranged in the specific direction are alternately arranged in a direction perpendicular to the specific direction. The image generation pixels and the phase difference detection pixels are alternately arranged so that the image generation pixels constituting the first line and the phase difference detection pixels constituting the second line adjacent to the first line overlap by portions thereof in the perpendicular direction.

17 Claims, 11 Drawing Sheets

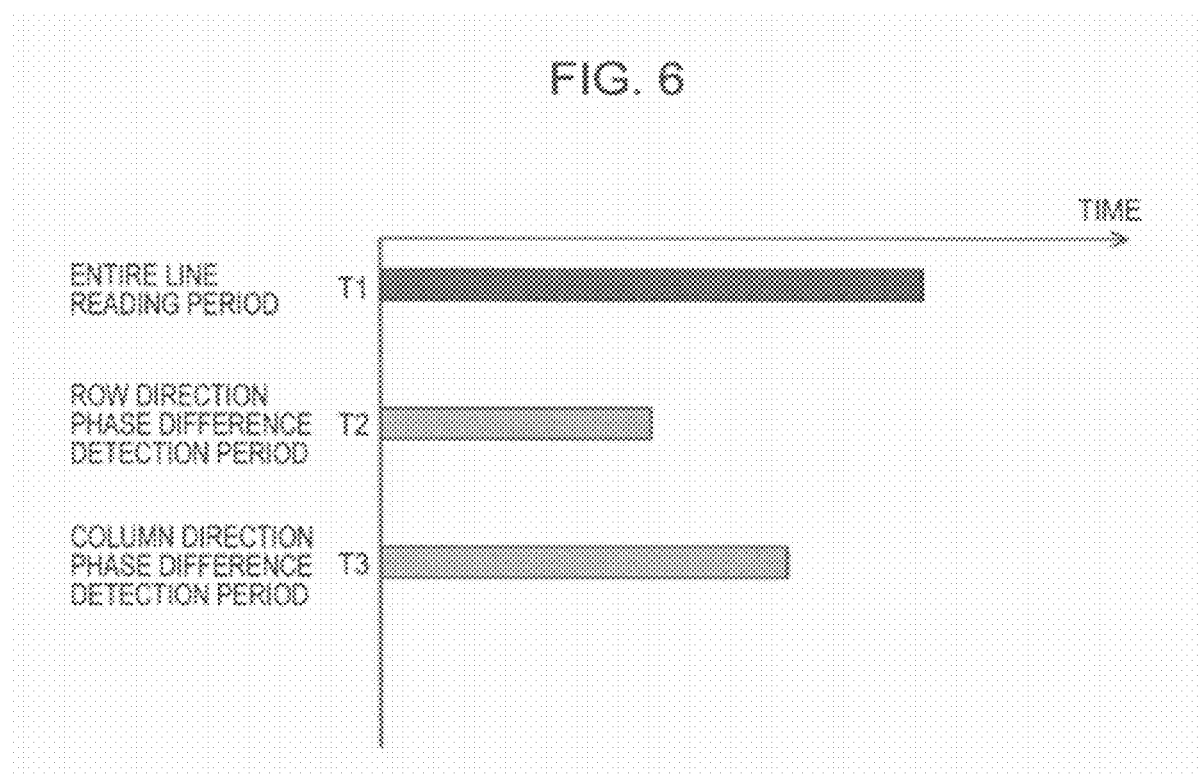

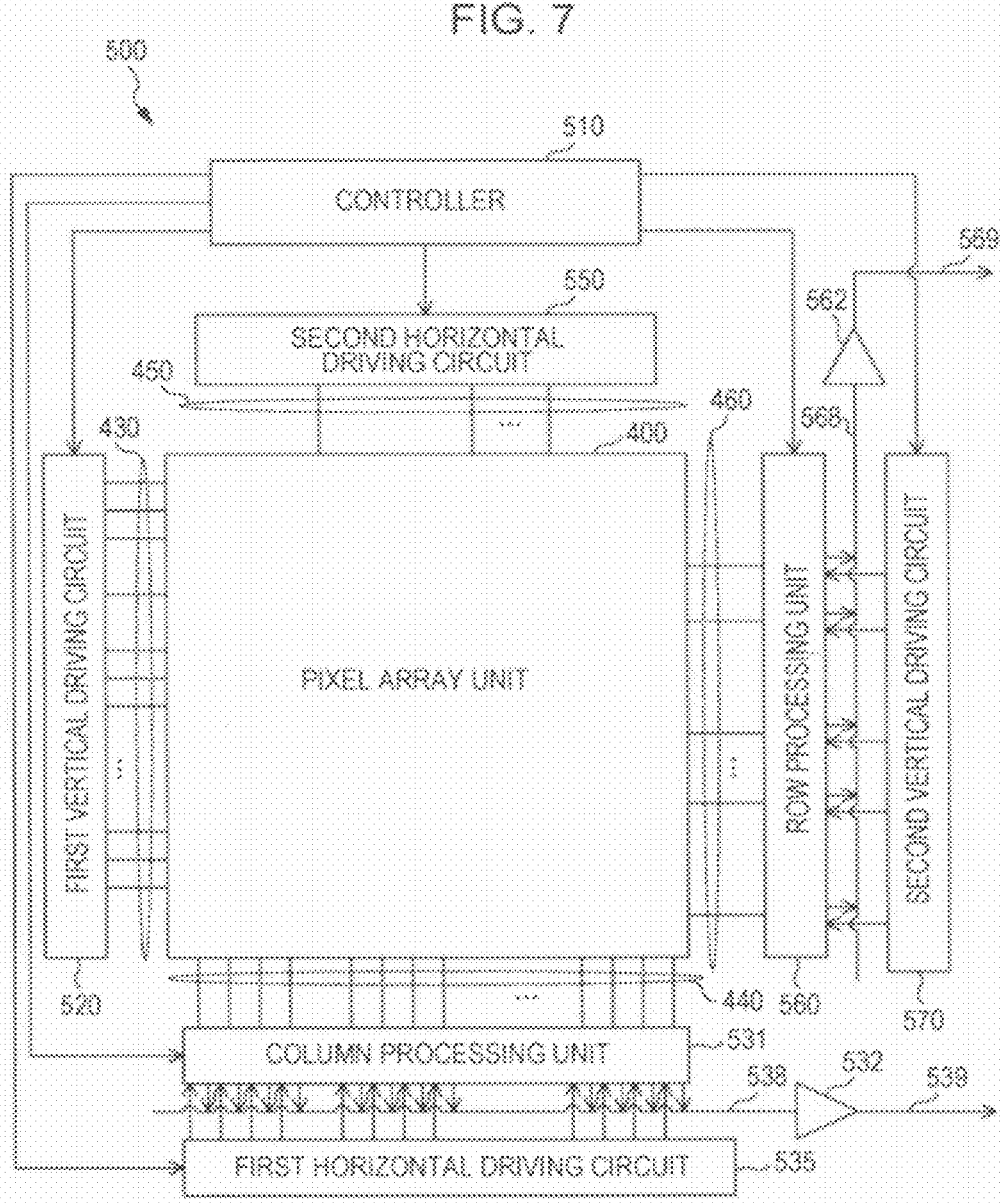

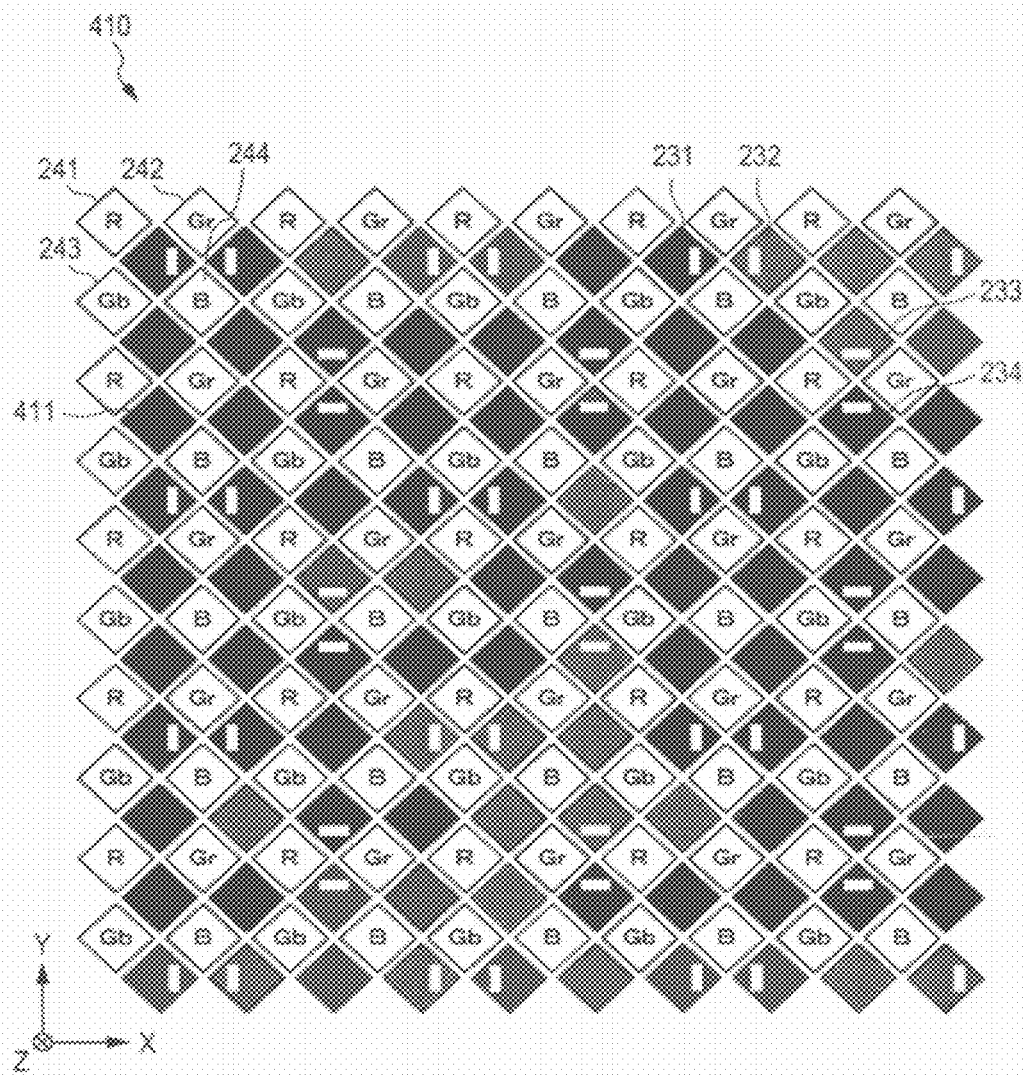

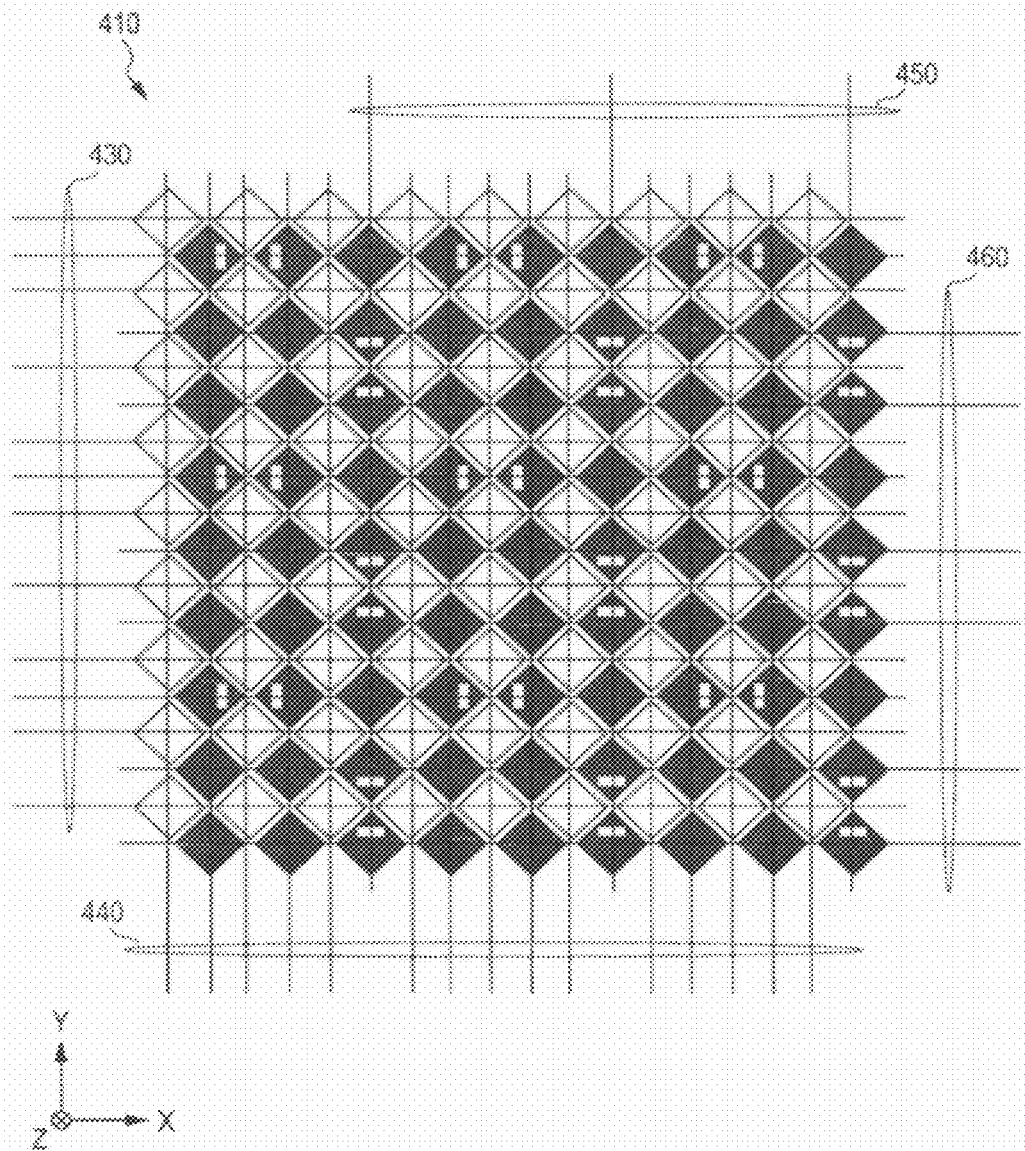

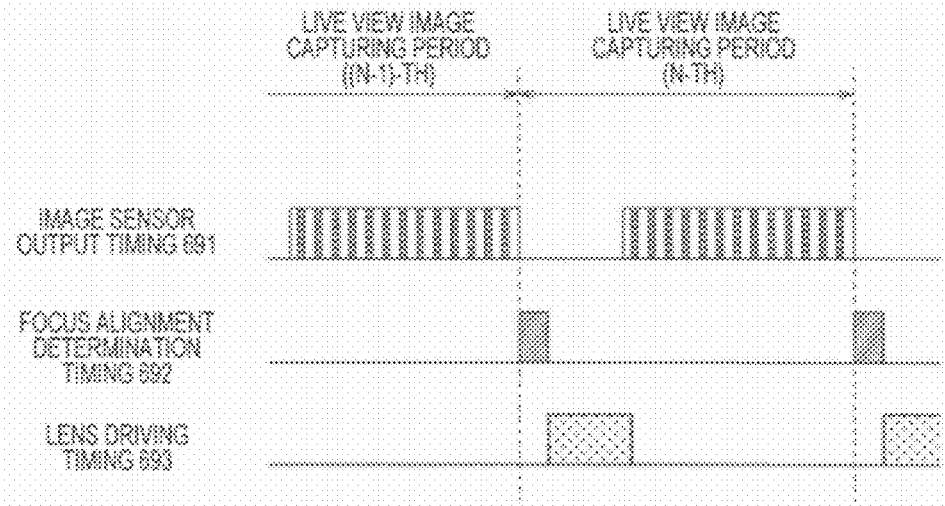
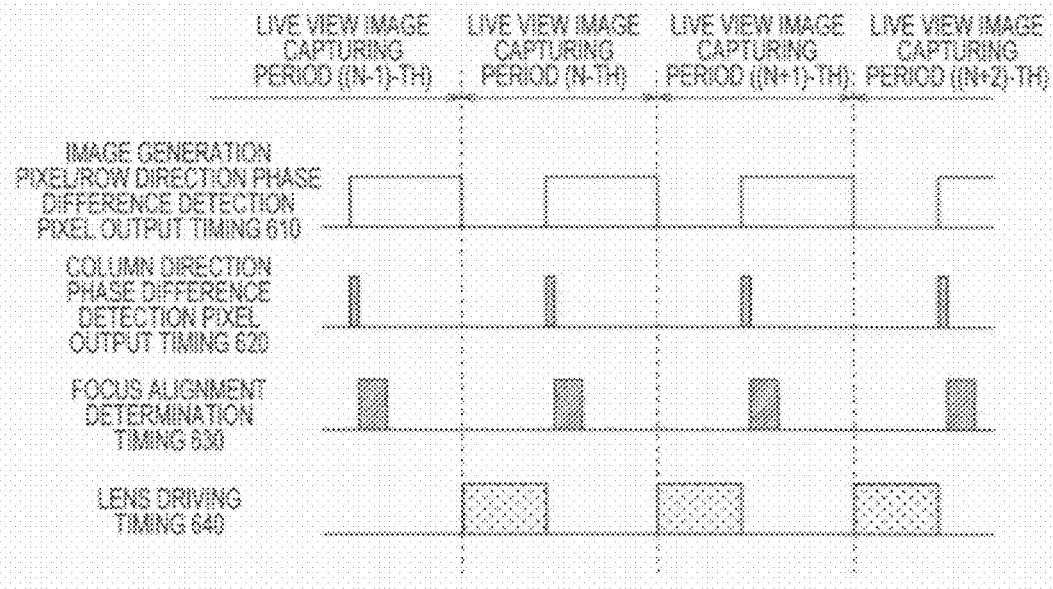

IMAGING DEVICE AND IMAGING APPARATUS FOR PERFORMING FOCUS ALIGNMENT

BACKGROUND

The present disclosure relates to an imaging device, and more particularly, to an imaging device and an imaging apparatus capable of performing phase difference detection and image capturing.

Recently, an imaging apparatus such as a digital still camera which generates a captured image by capturing an image of a subject such as a person and records the generated captured image has become widespread. In addition, as the imaging apparatus, an imaging apparatus having an auto focus (AF) function of automatically performing focus (focal point) adjustment at the time of image capturing in order to simplify user's photographing manipulation has become widespread.

As the imaging apparatus, for example, an imaging apparatus having an imaging device where pixels (phase difference detection pixels) for the phase difference detection (focus detection) and pixels (image generation pixels) for captured image generation are arranged in a zigzag pattern is disclosed (for example, refer to Japanese Unexamined Patent Application Publication No. 2010-220192).

In the imaging device included in the imaging apparatus, the rows where the phase difference detection pixels are arranged and the rows where the image generation pixels are arranged are alternately arranged, and the phase difference detection pixels and the image generation pixels are arranged so as to be shifted from each other by approximately half a pixel. In the imaging apparatus, a pair of images are formed by pupil-splitting light transmitting an imaging lens by using a pair of the phase difference detection pixels, an interval between the formed images is measured (phase difference detection); and focus is aligned by adjusting the position of the imaging lens based on the measured interval (focus adjustment).

In addition, in the imaging device, a pair of the phase difference detection pixels which detect a row direction phase difference are alternately arranged in two adjacent rows, and a pair of the phase difference detection pixels which detect a column direction phase difference are arranged in two rows of the phase difference detection pixel rows. In other words, in the imaging device, in the rows where the phase difference detection pixels are arranged, the phase difference detection pixels which detect the row direction phase difference and the phase difference detection pixels which detect the column direction phase difference are alternately arranged.

SUMMARY

In the aforementioned related art, the phase difference detection pixel rows and the image generation pixel rows are alternately arranged, and the phase difference detection pixels and the image generation pixels are arranged so as to be shifted from each other by approximately half a pixel. Therefore, although image signals of the phase difference detection pixels are not calculated by an interpolation process, the captured image may be generated.

In addition, in the aforementioned related art, the row direction phase difference and the column direction phase difference may be detected. Therefore, the direction (row direction or column direction) of the phase difference detection suitable for a focus alignment target object may be used, so that it is possible to improve accuracy of the phase difference detection.

However, in the aforementioned related art, a pair of the phase difference detection pixels which detect the column direction phase difference are arranged in the two rows of the phase difference detection pixel rows. Therefore, in order to read data from the column direction phase difference detection pixels, it is necessary to perform reading of two rows per pair of phase difference detection pixels. In addition, the data reading direction from the pixels in the imaging device is generally one direction (row direction). Therefore, in the case of detecting the column direction phase difference, it is necessary to perform reading of the rows of which the number is twice the number of the phase difference detection pixels constituting a pair in order to form a pair of the images. In other words, in the case of performing the column direction phase difference detection (the case where there are a large number of to-be-read rows), the number of to-be-read rows is large, and a great deal of time is taken to read data from the imaging device.

It is desirable to improve a reading speed relating to a column direction phase difference detection process in an imaging device having image generation pixels and phase difference detection pixels.

According to the first embodiment of the present disclosure, there is provided an imaging device including: a plurality of image generation pixels which generate signals for generating an image; and a plurality of phase difference detection pixels which generate signals for performing focus alignment determination by phase difference detection, wherein first lines where the image generation pixels constituting the plurality of the image generation pixels are configured to be arranged in a specific direction and second lines where the phase difference detection pixels constituting the plurality of the phase difference detection pixels are configured to be arranged in the specific direction are alternately arranged in a perpendicular direction perpendicular to the specific direction, the image generation pixels and the phase difference detection pixels are alternately arranged so that the image generation pixels constituting the first line and the phase difference detection pixels constituting the second line adjacent to the first line overlap each other by portions thereof in the perpendicular direction, and the second lines are constructed with third lines where the phase difference detection pixels where pupil splitting is performed in the specific direction are arranged as specific direction phase difference detection pixels and fourth lines where the phase difference detection pixels where pupil splitting is performed in the perpendicular direction are arranged as perpendicular direction phase difference detection pixels, and the third lines and the fourth lines are alternately arranged in the perpendicular direction. By doing so, it is possible to obtain a function in that, in the imaging device, the image generation pixel rows and the phase difference detection pixel rows are alternately arranged, the image generation pixels and the phase difference detection pixels adjacent thereto are alternately arranged so as to overlap each other by portions thereof, and in the phase difference detection pixel rows, the rows where the specific direction phase difference detection pixels where pupil splitting is performed in the specific direction are arranged and the rows where the perpendicular direction phase difference detection pixels where pupil splitting is performed in the perpendicular direction are arranged are alternately arranged.

In addition, in the first embodiment, in the first line, the image generation pixels constituting the first line and the phase difference detection pixels constituting the second line adjacent to the first line may be alternately arranged in the perpendicular direction so as to overlap each other by approximately half a pixel. By doing so, it is possible to obtain a function in that the image generation pixels and the phase difference detection pixels are alternately arranged so as to overlap each other by approximately half a pixel.

In addition, in the first embodiment, the image generation pixels and the phase difference detection pixels may be arranged in a tilted pixel arrangement. By doing so, it is possible to obtain a function in that the image generation pixels and the phase difference detection pixels are arranged in a tilted pixel arrangement.

In addition, in the first embodiment, the specific direction may be a reading direction in the case where the signals generated by the phase difference detection pixels and the image generation pixels are read from the phase difference detection pixels and the image generation pixels. By doing so, it is possible to obtain a function in that the first lines which are configured by arranging the image generation pixels in the reading direction and the second lines which are configured by arranging the phase difference detection pixels in the reading direction are alternately arranged.

In addition, in the first embodiment, in the third line, a pair of the specific direction phase difference detection pixels which receive a pair of the subject light beams pupil-split in the specific direction may be arranged in the specific direction to be adjacent to each other; the pair of the specific direction phase difference detection pixels arranged to be adjacent to each other may be repetitively arranged in the specific direction; and in the fourth line, a pair of the perpendicular direction phase difference detection pixels which receive a pair of the subject light beams pupil-split in the perpendicular direction may be arranged in the specific direction to be adjacent to each other. By doing so, it is possible to obtain a function in that, in the third line, a pair of the specific direction phase difference detection pixels which receive a pair of the subject light beams pupil-split in the specific direction are arranged in the specific direction to be adjacent to each other, a pair of the specific direction phase difference detection pixels arranged to be adjacent to each other are repetitively arranged in the specific direction, and in the fourth line, a pair of the perpendicular direction phase difference detection pixels which receive a pair of the subject light beams pupil-split in the perpendicular direction are arranged in the specific direction to be adjacent to each other.

In addition, in the first embodiment, the specific direction may be a reading direction in the case where the signals generated by the specific direction phase difference detection pixels and the signals generated by the image generation pixels are read from the specific direction phase difference detection pixels and the image generation pixels; and the perpendicular direction may be a reading direction in the case where the signals generated by the perpendicular direction phase difference detection pixels are read from the perpendicular direction phase difference detection pixels. By doing so, it is possible to obtain a function in that, the signals generated by the specific direction phase difference detection pixels and the image generation pixels are sequentially read in the specific direction in the order of the arrangement, and the signals generated by the perpendicular direction phase difference detection pixels are sequentially read in the perpendicular direction in the order of the arrangement.

In addition, in the first embodiment, in the third line, a pair of the specific direction phase difference detection pixels which receive a pair of the subject light beams pupil-split in the specific direction may be arranged in the specific direction to be adjacent to each other, and a pair of the specific direction phase difference detection pixels may be repetitively arranged interposing a first pixel which is not used for the specific direction phase difference detection; and in the fourth line, the perpendicular direction phase difference detection pixels may be arranged at the positions perpendicular to the position where the first pixel is arranged, and the second pixels which are not used for the perpendicular direction phase difference detection may be arranged at the positions other than the positions perpendicular to the position where the first pixel is arranged. By doing so, it is possible to obtain a function in that the specific direction phase difference detection pixels are arranged in one row, and the perpendicular direction phase difference detection pixels are arranged in one column.

In addition, in the first embodiment, the third lines may be constructed with the lines where the specific direction phase difference detection pixels are arranged in one row; the fourth lines may be constructed with the lines where the perpendicular direction phase difference detection pixels are arranged in two rows; and in the fourth lines of the two rows, a pair of the perpendicular direction phase difference detection pixels which receive a pair of the subject light beams pupil-split in the perpendicular direction are arranged in the perpendicular direction to be adjacent to each other. By doing so, it is possible to obtain a function in that the specific direction phase difference detection pixels are arranged in one row, the perpendicular direction phase difference detection pixels are arranged in one column, and the interval between a pair of the phase difference detection pixels of the specific direction phase difference detection pixels and the interval between a pair of the phase difference detection pixels of the perpendicular direction phase difference detection pixels become the same.

In addition, in the first embodiment, the imaging device may further include: first signal lines which are interconnected in the perpendicular direction at the positions where the specific direction phase difference detection pixels and the image generation pixels are arranged in order to sequentially transmit the signals generated by the specific direction phase difference detection pixels and the image generation pixels and which are connected to the specific direction phase difference detection pixels and the image generation pixels; first selection lines which are interconnected in the specific direction to the rows constituting the first lines and the rows constituting the third lines in order to select the rows which sequentially transmit the signals generated by the specific direction phase difference detection pixels and the image generation pixels and which are connected to the specific direction phase difference detection pixels and the image generation pixels; second signal lines which are interconnected in the specific direction to the rows constituting the fourth lines in order to sequentially transmit the signals generated by the perpendicular direction phase difference detection pixels and which are connected to the perpendicular direction phase difference detection pixels; and second selection lines which are interconnected in the perpendicular direction at the positions where the perpendicular direction phase difference detection pixels are arranged in order to select the perpendicular direction position where the signals generated by the perpendicular direction phase difference detection pixels are sequentially transmitted and which are connected to the perpendicular direction phase difference detection pixels. By doing so, it is possible to obtain a function in that, the first signal lines and the first selection lines are connected to the specific direction phase difference detection pixels and the image generation pixels, and second signal lines and the second selection lines are connected to the perpendicular direction phase difference detection pixels.

In addition, in the first embodiment, the imaging device may further include: a first driving unit which drives the specific direction phase difference detection pixels and the image generation pixels through the first selection lines; a first signal processing unit which performs a signal process on the signals generated by the specific direction phase difference detection pixels and the image generation pixels supplied through the first signal lines; a second driving unit which drives the perpendicular direction phase difference detection pixels through the second selection lines; and a second signal processing unit which performs a signal process on the signals generated by the perpendicular direction phase difference detection pixels supplied through the second signal lines. By doing so, it is possible to obtain a function in that the signals are read from the specific direction phase difference detection pixels and the image generation pixels by the first driving unit and the first signal processing unit, and the signals are read from the perpendicular direction phase difference detection pixels by the second driving unit and the second signal processing unit.

In addition, according to a second embodiment of the present disclosure, there is provided an imaging device including: a pixel array unit including a plurality of image generation pixels which generate signals for generating an image and a plurality of phase difference detection pixels which generate signals for performing focus alignment determination by phase difference detection, wherein first lines which are configured by arranging a portion of the image generation pixels among the plurality of the image generation pixels in a specific direction and second lines which are configured by arranging a portion of the phase difference detection pixels among the plurality of the phase difference detection pixels in the specific direction are alternately arranged in a perpendicular direction perpendicular to the specific direction, and the image generation pixels and the phase difference detection pixels are alternately arranged so that the image generation pixels constituting the first line and the phase difference detection pixels constituting the second line adjacent to the first line overlap each other by portions thereof in the perpendicular direction; first signal lines which are interconnected in the perpendicular direction perpendicular to the specific direction at the positions where specific direction phase difference detection pixels and the image generation pixels arranged in order to sequentially transmit the signals generated by the plurality of the image generation pixels and the specific direction phase difference detection pixels where pupil splitting is performed in the specific direction among the plurality of the phase difference detection pixels and which are connected to the image generation pixels and the specific direction phase difference detection pixels; first selection lines which are interconnected in the specific direction to the lines where the specific direction phase difference detection pixels are arranged among the first lines and the second lines in order to select the lines which sequentially transmit the signals generated by the specific direction phase difference detection pixels and the image generation pixels and which are connected to the specific direction phase difference detection pixels and the image generation pixels; second signal lines which are interconnected in the specific direction to the lines where the perpendicular direction phase difference detection pixels are arranged among the second lines in order to sequentially transmit the signals generated by the perpendicular direction phase difference detection pixels where pupil splitting is performed in the perpendicular direction among the plurality of the phase difference detection pixels and which are connected to the perpendicular direction phase difference detection pixels; second selection lines which are interconnected in the perpendicular direction at the positions where the perpendicular direction phase difference detection pixels are arranged in order to select the perpendicular direction positions which sequentially transmit the signals generated by the perpendicular direction phase difference detection pixels and which are connected to the perpendicular direction phase difference detection pixels; a first driving unit which drives the specific direction phase difference detection pixels and the image generation pixels through the first selection lines; a first signal processing unit which performs a signal process on the signals generated by the specific direction phase difference detection pixels and the image generation pixels supplied through the first signal lines; a second driving unit which drives the perpendicular direction phase difference detection pixels through the second selection lines; and a second signal processing unit which performs a signal process on the signals generated by the perpendicular direction phase difference detection pixels supplied through the second signal lines. By doing so, it is possible to obtain a function in that the signals are read from the specific direction phase difference detection pixels and the image generation pixels by the first driving unit and the first signal processing unit, and the signals are read from the perpendicular direction phase difference detection pixels by the second driving unit and the second signal processing unit.

In addition, according to a third embodiment of the present disclosure, there is provided an imaging apparatus including: an imaging device including a plurality of image generation pixels which generate signals for generating an image and a plurality of phase difference detection pixels which generate signals for performing focus alignment determination by phase difference detection, wherein first lines where the image generation pixels constituting the plurality of the image generation pixels are configured to be arranged in a specific direction and second lines where the phase difference detection pixels constituting the plurality of the phase difference detection pixels are configured to be arranged in the specific direction are alternately arranged in a perpendicular direction perpendicular to the specific direction, the image generation pixels and the phase difference detection pixels are alternately arranged so that the image generation pixels constituting the first line and the phase difference detection pixels constituting the second line adjacent to the first line overlap each other by portions thereof in the perpendicular direction, and the second lines are constructed with third lines where the phase difference detection pixels where pupil splitting is performed in the specific direction are arranged as specific direction phase difference detection pixels and fourth lines where the phase difference detection pixels where pupil splitting is performed in the perpendicular direction are arranged as perpendicular direction phase difference detection pixels, and the third lines and the fourth lines are alternately arranged in the perpendicular direction; a focus alignment determination unit which performs focus alignment determination by phase difference detection based on the signals generated by the phase difference detection pixels; and an image generation unit which generates an image based on the signals generated by the image generation pixels. By doing so, it is possible to obtain a function in that the focus alignment determination is performed by using the imaging device where the image generation pixel rows and the phase difference detection pixel rows are alternately arranged; the image generation pixels and the adjacent phase difference detection pixels are alternately arranged so as to overlap each other by portions thereof; and in the phase difference detection pixel rows, the rows where the specific direction phase difference detection pixels where pupil splitting is performed in the specific direction are arranged and the rows where the perpendicular direction phase difference detection pixels where pupil splitting is performed in the perpendicular direction are arranged are alternately arranged.

According to the present disclosure, in an imaging device having image generation pixels and phase difference detection pixels, it is possible to obtain an excellent effect in that it is possible improve a reading speed relating to a column direction phase difference detection process.

BRIEF DESCRIPTION OF THE DRAWINGS

FIG. 6 is a schematic diagram illustrating a data reading time of the image sensor according to the first embodiment of the present disclosure;

FIG. 7 is a block diagram illustrating an example of a basic configuration of an image sensor according to a second embodiment of the present disclosure;

FIG. 8 is a schematic diagram illustrating an example of an arrangement of pixels included in the image sensor according to the second embodiment of the present disclosure;

FIG. 9 is a schematic diagram illustrating an example of selection lines and signal lines which are disposed to each of the pixels in the image sensor according to the second embodiment of the present disclosure;

FIG. 10A is a timing chart illustrating an example of operations when detecting a column direction phase difference and performing focusing in the second embodiment of the present disclosure;

FIG. 10B is a timing chart illustrating an example of operations when performing the same operation by using the image sensor described at a time T1 of FIG. 6.

DETAILED DESCRIPTION OF EMBODIMENTS

Hereinafter, embodiments (hereinafter, referred to as embodiments) for embodying the present disclosure will be described. The description is made in the following order.
1. First Embodiment (Imaging Control: Example where row direction phase difference detection pixel rows and column direction phase difference detection pixel rows are alternately disposed in phase difference detection pixel rows)
2. Second Embodiment (Imaging Control: Example where column direction phase difference detection pixels are read in column direction)
3. Modified Example
<1. First Embodiment>
[Example Of Functional Configuration Of Imaging Apparatus]

Figure 1:
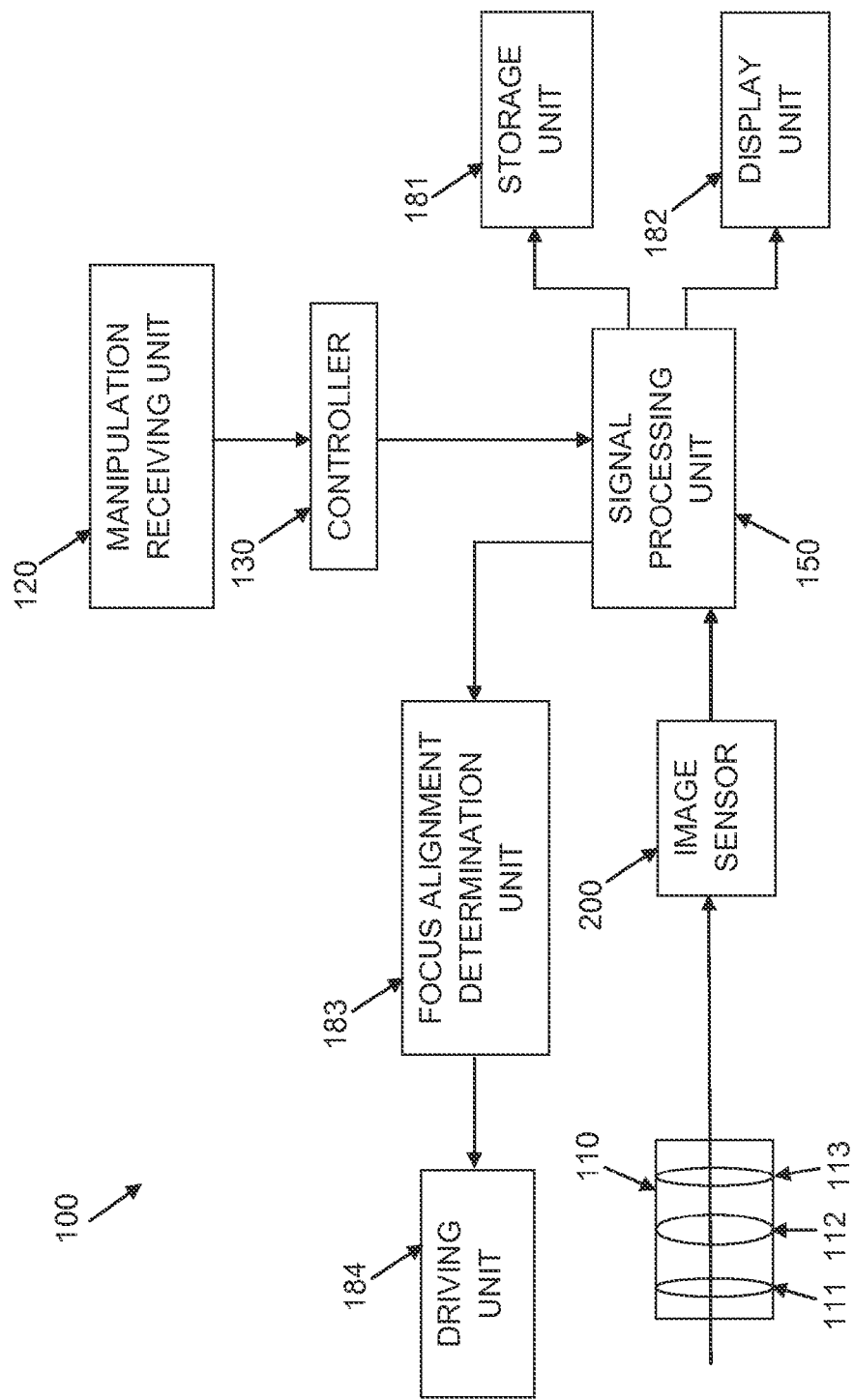
FIG. 1 is a block diagram illustrating an example of a functional configuration of an imaging apparatus according to a first embodiment of the present disclosure.

FIG. 1 is a block diagram illustrating an example of a functional configuration of an imaging apparatus 100 according to the first embodiment of the present disclosure. The imaging apparatus 100 is an imaging apparatus which images a subject to generate image data (a captured image) and records the generated image data as an image content (a still picture content or a moving picture content). In addition, hereinafter, an example where the still picture content (still picture file) is recorded as the image content (image file) is mainly disclosed.

The imaging apparatus 100 includes a lens unit 110, a manipulation receiving unit 120, a controller 130, an image sensor 200, a signal processing unit 150, a storage unit 181, a display unit 182, a focus alignment determination unit 183, and a driving unit 184.

The lens unit 110 collects light (subject light) from the subject. The lens unit 110 includes a zoom lens 111, a diaphragm 112, and a focus lens 113.

The zoom lens 111 adjusts a magnification ratio of the subject included in the captured image by changing a focal length by moving in the optical axis direction through driving of the driving unit 184.

The diaphragm 112 is a covering member for adjusting a light amount of the subject light incident on the image sensor 200 by changing a degree of opening through driving of the driving unit 184.

The focus lens 113 adjusts focus by moving in the optical axis direction through driving of the driving unit 184.

The manipulation receiving unit 120 receives manipulation from a user. For example, in the case where a shutter button 121 (illustrated in FIG. 2) is pushed, the manipulation receiving unit 120 supplies a signal relating to the pushing as a manipulation signal to the controller 130.

The controller 130 controls operation of each component of the imaging apparatus 100. For example, in the case where the shutter button 121 is pushed and a manipulation signal for starting recording of a still image is received, the controller 130 supplies a signal (still image capturing operation signal) relating to still image recording execution to the signal processing unit 150. In addition, in the case where a live view is to be displayed on the display unit 182, the controller 130 supplies a signal (the live view display signal) for generating a live view image based on signals output from the image sensor 200 to the signal processing unit 150. Herein, the live view is a real-time display of a subject image incident on the imaging apparatus 100. In addition, in the case where the focus alignment determination is to be performed in a phase difference detection method, the controller 130 supplies a signal (phase difference detection operation signal) indicating an operation (phase difference detection operation) of performing the focus alignment determination to the signal processing unit 150. Herein, the phase difference detection method is a focus detection method of detecting a degree of focus alignment by performing pupil-splitting on light transmitting through the imaging lens to form a pair of the images and measuring an interval (a shift amount between the images) between the formed images (performing phase difference detection).

The image sensor 200 is an imaging device which photoelectrically converts the received subject light to an electrical signal. The image sensor 200 is constructed with, for example, a CMOS (Complementary Metal Oxide Semiconductor) sensor, a CCD (Charge Coupled Device) sensor, or the like. In the image sensor 200, disposed are pixels (image generation pixels) which generate signals for generating the captured image based on the received subject light and pixels (phase difference detection pixels) which generate signals for performing the phase difference detection. In addition, the image sensor 200 will be described with reference to FIG. 3 to FIG. 6. The image sensor 200 supplies the electrical signals generated through the photoelectric conversion to the signal processing unit 150. In addition, the image sensor 200 is an example of the imaging device disclosed in the embodiments of the present disclosure.

The signal processing unit 150 applies various signal processes to the electrical signals supplied from the image sensor 200. For example, in the case where the still image capturing operation signal is supplied from the controller 130, the signal processing unit 150 generates data (still image data) of the still image. Next, the signal processing unit 150 supplies the generated image data to the storage unit 181 to store the image data in the storage unit 181. In addition, in the case where the phase difference detection operation signal is supplied from the controller 130, the signal processing unit 150 generates data (phase difference detection data) for detecting the phase difference based on output signals of the phase difference detection pixels in the image sensor 200. Next, the signal processing unit 150 supplies the generated phase difference detection data to the focus alignment determination unit 183.

In addition, in the case where the live view display signal is supplied from the controller 130, the signal processing unit 150 generates data (live view image data) of the live view image based on the output signals of the image generation pixels in the image sensor 200. Next, the signal processing unit 150 supplies the generated live view image data to the display unit 182 to display the live view on a display screen of the display unit 182. In addition, the signal processing unit 150 is an example of the image generation unit disclosed in the embodiments of the present disclosure.

The storage unit 181 records the image data supplied from the signal processing unit 150 as the image content (image file). A removable recording medium (one medium or a plurality of recording media), for example, a disc such as a DVD (Digital Versatile Disc), a semiconductor memory such as a memory card, or the like may be used as the storage unit 181. In addition, the recording medium may be built in the imaging apparatus 100, or the recording medium may be detachably installed in the imaging apparatus 100.

The display unit 182 displays the image based on the image data supplied from the signal processing unit 150. The display unit 182 is constructed with, for example, a color liquid crystal panel. For example, in the case where the live view image data is supplied from the signal processing unit 150, the display unit 182 displays the live view image on the display screen.

The focus alignment determination unit 183 determines whether or not focus is aligned with an object (focus alignment target object) as a focus alignment target based on the phase difference detection data supplied from the signal processing unit 150. In the case where focus is aligned with the object (focus alignment target object) in an area (focus area) where focusing is performed, the focus alignment determination unit 183 supplies information indicating that focus is aligned as focus alignment determination result information to the driving unit 184. In addition, in the case where focus is not aligned with the focus alignment target object, the focus alignment determination unit 183 calculates a focus shift amount (defocus amount) and supplies information indicating the calculated defocus amount as focus alignment determination result information to the driving unit 184.

The driving unit 184 drives the zoom lens 111, the diaphragm 112, and the focus lens 113. For example, the driving unit 184 calculates a driving amount of the focus lens 113 based on the focus alignment determination result information output from the focus alignment determination unit 183 and moves the focus lens 113 according to the calculated driving amount. In the case where focus is aligned, the driving unit 184 maintains the current position of the focus lens 113. In addition, in the case where focus is not aligned, the driving unit 184 calculates a driving amount (moving distance) based on the focus alignment determination result information indicating the defocus amount and information on the position of the focus lens 113 and moves the focus lens 113 according to the driving amount.

[Example of Cross-Sectional Configuration of Imaging Apparatus]

Figure 2:
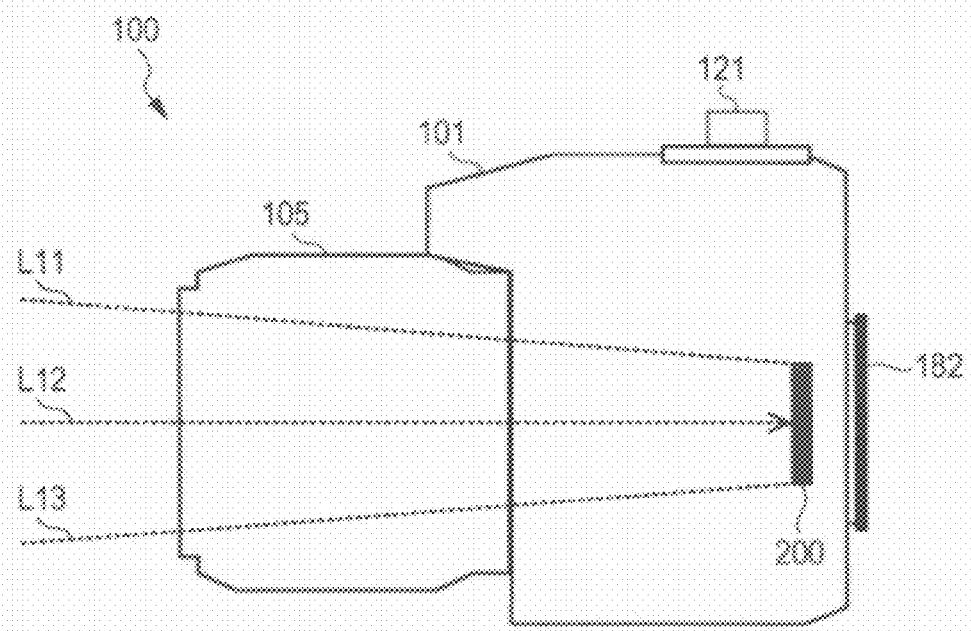
FIG. 2 is a schematic cross-sectional diagram illustrating an example of a cross-sectional configuration of the imaging apparatus according to the first embodiment of the present disclosure.

FIG. 2 is a schematic cross-sectional diagram illustrating an example of a cross-sectional configuration of the imaging apparatus 100 according to the first embodiment of the present disclosure. In addition, in FIG. 2, the imaging apparatus 100 is illustrated to be assumed as a single lens camera.

FIG. 2 illustrates a body 101 and an interchangeable lens 105 as a cross-sectional diagram of the imaging apparatus 100. The interchangeable lens 105 is a detachable lens unit of the imaging apparatus 100 and corresponds to the lens unit 110 illustrated in FIG. 1. The body 101 is a main body which performs an imaging process of the imaging apparatus 100 and corresponds to the configuration excluding the lens unit 110 illustrated in FIG. 1. The shutter button 121, the display unit 182, and the image sensor 200 are illustrated in the body 101.

In addition, FIG. 2 illustrates an optical axis (optical axis L12) of the lens included in the lens unit 110 and two lines (lines L11 and L13) indicating a range where the subject light transmits. In addition, the range interposed by the line L11 and the line L13 indicates a range where the light incident on the image sensor 200 transmits.

As illustrated in FIG. 2, in the imaging apparatus 100, all of the incident subject light is incident on the image sensor 200. In other words, in the case where the phase difference detection is performed in the imaging apparatus 100, the phase difference detection is performed by using the signals generated by the image sensor 200.

[Example of Arrangement of Pixels in Image Sensor]

Figure 3:
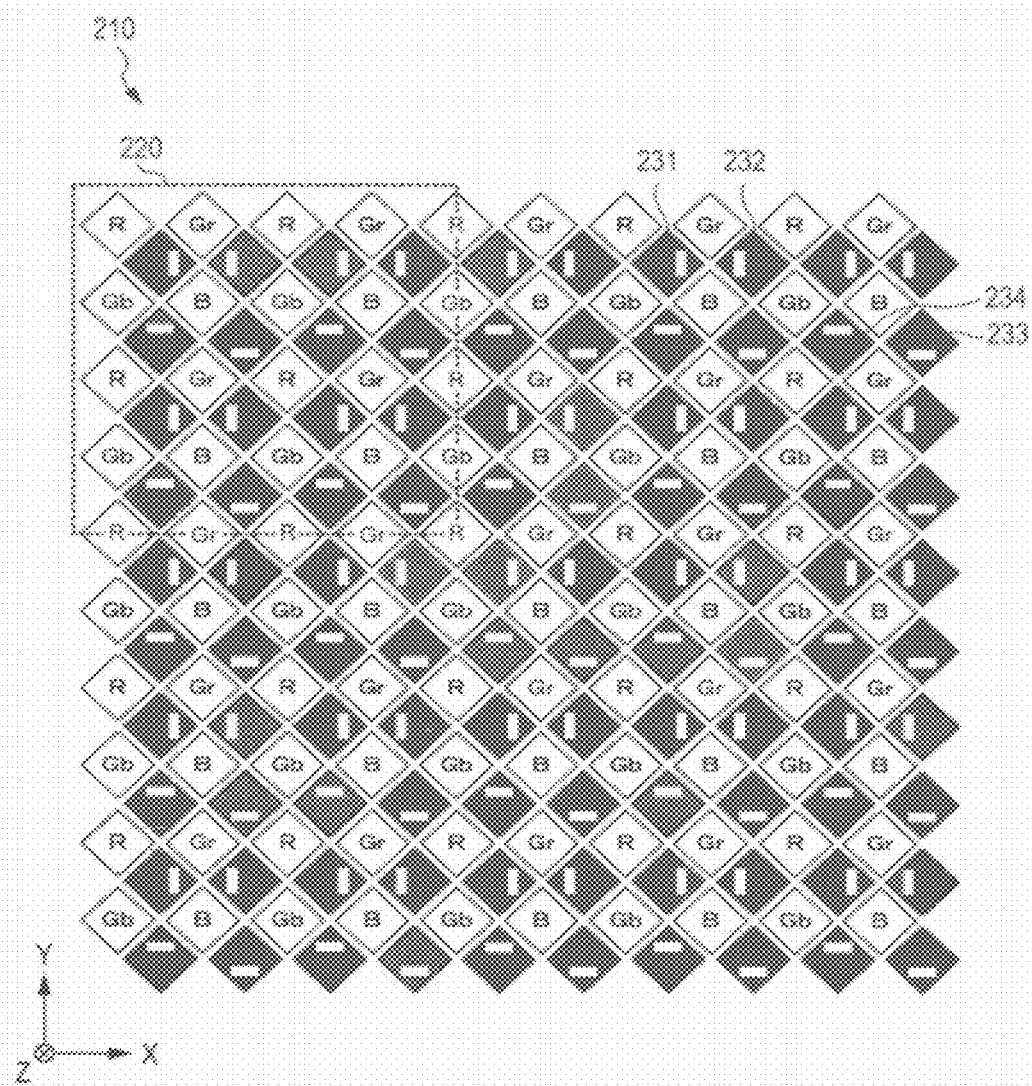
FIG. 3 is a schematic diagram illustrating an example of an arrangement of pixels included in an image sensor according to the first embodiment of the present disclosure.

FIG. 3 is a schematic diagram illustrating an example of arrangement of pixels included in the image sensor 200 according to the first embodiment of the present disclosure.

In FIG. 3, the description is made under the assumption of X and Y axes that the up-down direction is set as the Y axis and the left-right direction is set as the X axis. In addition, in FIG. 3, the lower left corner is set as the origin of the X and Y axes; the direction from the bottom toward the top is set as the + side of the Y axis; and the direction from the left toward the right is set as the + side of the X axis. In addition, in FIG. 3, a specific direction (a direction corresponding to the horizontal direction (left-right direction) of the captured image) of the image sensor 200 is set as the X axis direction; and the perpendicular direction (a direction corresponding to the vertical direction (up-down direction) of the captured image) perpendicular to the specific direction is set as the Y axis direction. In addition, the signal reading direction of the image sensor 200 is set to the X axis direction (the reading is performed in units of rows).

In FIG. 3, for the convenience of description, the description is made by using an area (area 210) including a portion of pixels (pixels of 20 rows×20 columns) among the pixels constituting the image sensor 200. In addition, the arrangement of the pixels in the image sensor 200 is an arrangement where the pixel arrangement illustrated in the area 210 is set as one unit and the pixel arrangements (the pixel arrangement corresponding the area 210) corresponding to the units are repetitively disposed in the X axis direction and the Y axis direction.

In FIG. 3, one pixel (a shape of an opening) is illustrated as one square (diamond shape) having a shape which is rotated by 45° with respect to the X axis direction. In addition, the image generation pixels are illustrated together with the symbols (R (red), G (green), and B (blue)) indicating color filters which may be provided. In addition, with respect to the pixels (G pixels) provided with the G color filters, the G pixels arranged in the rows including the R (red) pixels are indicated by the Gr pixels; and the G pixels arranged in the rows including the B (blue) pixels are indicated by the Gb pixels.

In addition, the phase difference detection pixels are indicated by gray diamond shapes with white rectangles added thereto. In addition, the white rectangle in the phase difference detection pixel indicates the side (the side where an opening portion exists in a light blocking layer) where the incident light is not blocked by the light blocking layer but received by the light receiving device). Herein, the phase difference detection pixels (the phase difference detection pixels 231 to 234) illustrated in FIG. 3 will be described.

The phase difference detection pixel 231 is a phase difference detection pixel where the light blocking layer is formed so as to block the subject light passing through the right half portion of the exit pupil among the subject light incident on a microlens of the phase difference detection pixel 231. In other words, the phase difference detection pixel 231 blocks the light of the right half portion among the light which is pupil-split in the left and right portions (the + and − sides of the X axis direction) of the exit pupil and receives the pupil-split light of the left half portion.

The phase difference detection pixel 232 is a phase difference detection pixel where the light blocking layer is formed so as to block the subject light passing through the left half portion of the exit pupil among the subject light incident on the microlens of the phase difference detection pixel 232. In other words, the phase difference detection pixel 232 blocks the light of the left half portion among the light which is pupil-split in the left and right portions (the + and − sides of the X axis direction) of the exit pupil and receives the pupil-split light of the right half portion. In addition, the phase difference detection pixel 232 and the phase difference detection pixel 231 are used as a pair, so that a pair of the images is formed. In addition, the phase difference detection pixels 231 and the phase difference detection pixels 232 are examples of the specific direction phase difference detection pixels disclosed in the embodiments of the present disclosure.

The phase difference detection pixel 233 is a phase difference detection pixel where the light blocking layer is formed so as to block the subject light passing through the lower half portion of the exit pupil among the subject light incident on the microlens of the phase difference detection pixel 233. In other words, the phase difference detection pixel 233 blocks the light of the lower half portion among the light which is pupil-split in the upper and lower portions (the + and − sides of the Y axis direction) of the exit pupil and receives the pupil-split light of the upper half portion.

The phase difference detection pixel 234 is a phase difference detection pixel where the light blocking layer is formed so as to block the subject light passing through the upper half portion of the exit pupil among the subject light incident on the microlens of the phase difference detection pixel 234. In other words, the phase difference detection pixel 234 blocks the light of the upper half portion among the light which is pupil-split in the upper and lower portions (the + and − sides of the Y axis direction) of the exit pupil and receives the pupil-split light of the lower half portion. In addition, the phase difference detection pixel 234 and the phase difference detection pixel 233 are used as a pair, so that a pair of the images is formed. In addition, the phase difference detection pixels 233 and the phase difference detection pixels 234 are examples of the perpendicular direction phase difference detection pixels disclosed in the embodiments of the present disclosure.

Herein, the arrangement of the pixels in the image sensor 200 is described.

In the image sensor 200, the image generation pixels and the phase difference detection pixels are arranged in a shape of a lattice in a tilted direction (in the embodiment of the present disclosure, referred to as a tilted pixel arrangement). In addition, in the image sensor 200, the rows (lines) where the image generation pixels are arranged and the rows (lines) where the phase difference detection pixels are arranged are alternately disposed in the direction (in the first embodiment of the present disclosure, referred to as a column direction) perpendicular to the reading direction. In other words, as illustrated in FIG. 3, the image generation pixel line, the phase difference detection pixel line, the image generation pixel line, the phase difference detection pixel line, . . . are alternately disposed in the Y axis direction. In addition, the image generation pixels and the phase difference detection pixels are alternately arranged so as to overlap each other by a portion thereof (approximately half a pixel). In addition, since the arrangement of the pixels in the image sensor 200 is a tilted pixel arrangement, with respect to the column direction (X axis direction), the columns where the image generation pixels are arranged and the columns where the phase difference detection pixels are arranged are alternately disposed so that the image generation pixels and the phase difference detection pixels overlap each other by half a pixel. In addition, the row where the image generation pixels are arranged and the row where the phase difference detection pixels are arranged are examples of the first line and the second line disclosed in the embodiments of the present disclosure.

In addition, in the image sensor 200, the lines where the phase difference detection pixels 231 and the phase difference detection pixels 232 are arranged and the lines where the phase difference detection pixels 233 and the phase difference detection pixels 234 are arranged are alternately disposed with interposing the image generation pixel rows therebetween. In other words, with respect to the phase difference detection pixels, the phase difference detection pixels where pupil splitting is performed in the same direction (the reading direction (left-right direction) or the direction (up-down direction) perpendicular to the reading direction) are arranged in units of rows. In addition, the line where the phase difference detection pixels 231 and the phase difference detection pixels 232 are arranged and the line where the phase difference detection pixels 233 and the phase difference detection pixels 234 are arranged are examples of the third line and the fourth line disclosed in the embodiments of the present disclosure.

In addition, in the lines where the phase difference detection pixels 231 and the phase difference detection pixels 232 are arranged, a pair of the phase difference detection pixels are arranged to be adjacent to each other in the row direction, and the pairs of the phase difference detection pixels arranged to be adjacent to each other are repetitively arranged in the row direction. In other words, the phase difference detection pixel 231 and the phase difference detection pixel 232 are arranged so as to form a pair of the images which split the exit pupil into left and right portions by using the phase difference detection pixels arranged in one row. In addition, in the image sensor 200, the phase difference detection pixel 233 and the phase difference detection pixel 234 are arranged so as to form a pair of the images which split the exit pupil into upper and lower portions by using the phase difference detection pixels arranged in two columns.

In this manner, in the image sensor 200, the rows where the image generation pixels are arranged and the rows where the phase difference detection pixels are arranged are alternately disposed. By doing so, during the reading of the data from the image sensor 200, the phase difference detection pixel lines which are not used for the phase difference detection may be skipped in the reading.

Next, the arrangement of the pixels according to the first embodiment of the present disclosure is described with reference to FIGS. 4A and 4B by concentrating on the pixels included in an area 220 (8×8 pixels).

[Example of Arrangement of Pixels in Image Sensor]

Figure 4A:
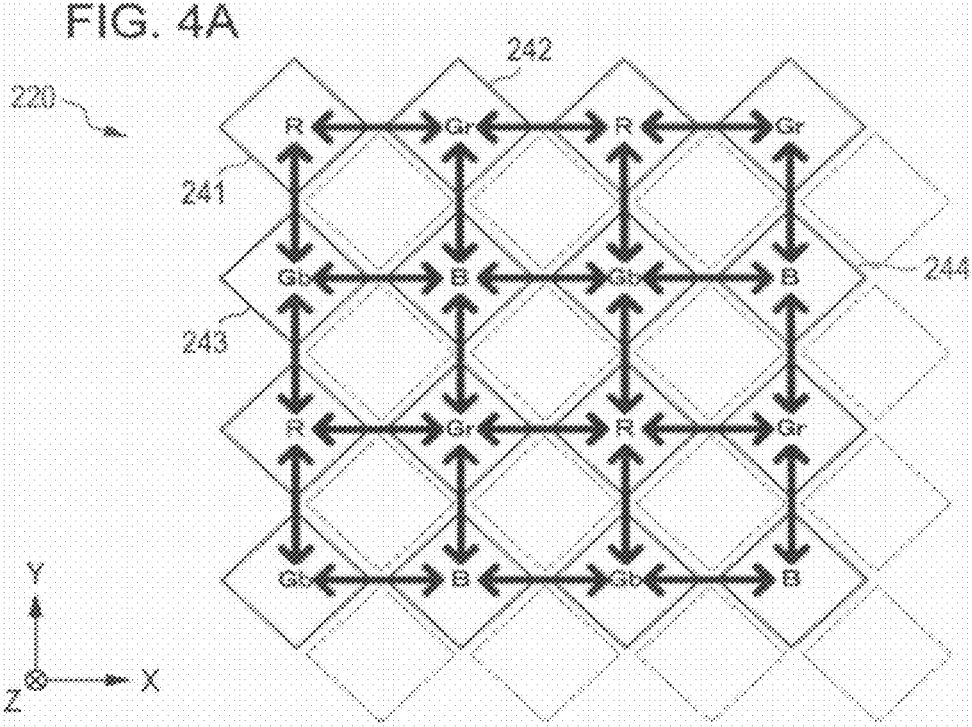
FIGS. 4A and 4B are top diagrams separately illustrating an arrangement of image generation pixels and an arrangement of phase difference detection pixels in an area of the image sensor according to the first embodiment of the present disclosure.
Figure 4B:
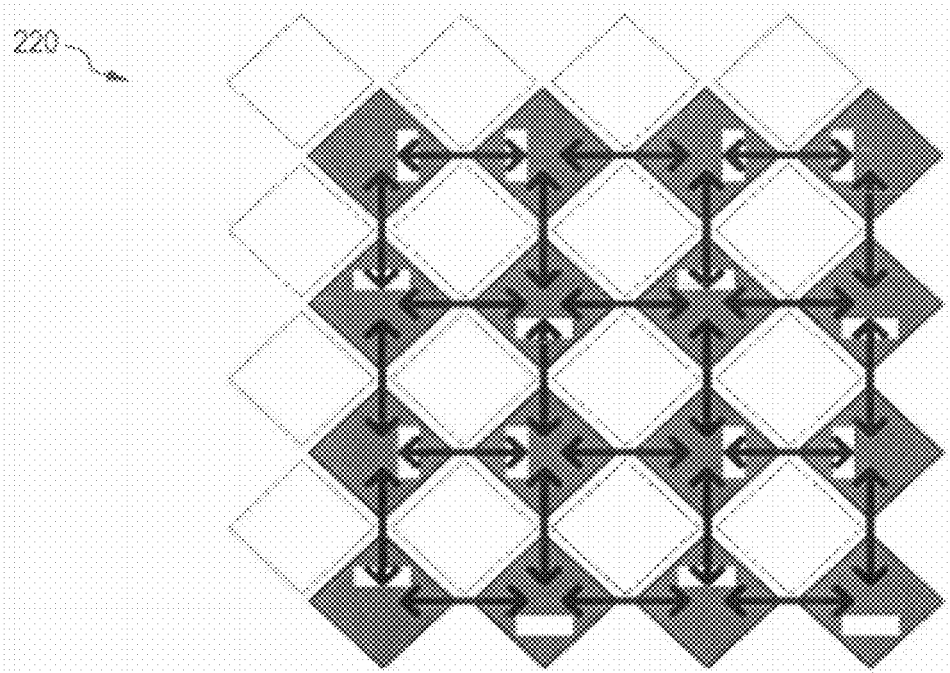

FIGS. 4A and 4B are top diagrams separately illustrating the arrangement of the image generation pixels and the arrangement of the phase difference detection pixels in the area 220 of the image sensor 200 according to the first embodiment of the present disclosure. In addition, in FIGS. 4A and 4B, the X and Y axes are assumed so that the left-right direction is set as the X axis and the up-down direction is set as the Y axis.

FIG. 4A illustrates a schematic diagram illustrating the arrangement of the image generation pixels in the image sensor 200. In FIG. 4A, illustrated are the image generation pixels in the area 220 of FIG. 3 together with symbols indicating the color filters, and the phase difference detection pixels in the area are illustrated by broken lines. In FIG. 4A, as the image generation pixels, illustrated are the pixels (R pixels 241) which receive red light by the color filters transmitting the red (R) light and the pixels (B pixels 244) which receive blue light by the color filters transmitting the blue (B) light. In addition, as the image generation pixels, illustrated are the pixels (G pixels 242 and 243) which receive green light by the color filters transmitting the green (G) light.

In the area 220 illustrated in FIG. 4A, the arrangement of only the image generation pixels excluding the lines where the phase difference detection pixels are arranged becomes a Bayer arrangement. In addition, in the arrangement of only the image generation pixels, with respect to the intervals between the image generation pixels in the row direction (X axis direction) and the column direction (Y axis direction), the row direction interval and the column direction interval are equal to each other.

In other words, in the image sensor 200, although the phase difference detection pixels and the image generation pixels are arranged, the distance between the image generation pixels in the row direction and the column direction becomes uniform, and the arrangement of the image generation pixels becomes a Bayer arrangement. By doing so, it is not necessary to supplement the image data corresponding to the positions of the phase difference detection pixels. In addition, since there is no deficiency in color information due to the arrangement of the phase difference detection pixels instead of the image generation pixel, there is no problem in that the accuracy in a demosaicing process deteriorates. Therefore, it is possible to improve image quality of a captured image of the imaging device where both the phase difference detection pixels and the image generation pixels are arranged.

FIG. 4B illustrates a schematic diagram illustrating the arrangement of the phase difference detection pixels in the image sensor 200. In FIG. 4B, illustrated are the phase difference detection pixels in the area 220 of FIG. 3, and the image generation pixels in the area are illustrated by broken lines.

In the area 220 illustrated in FIG. 4B, referring to the intervals between the phase difference detection pixels in the row direction (X axis direction) and the column direction (Y axis direction), similarly to the interval between the image generation pixels illustrated in FIG. 4A, the row direction interval and the column direction interval become equal to each other.

In this manner, in the image sensor 200, the rows where the image generation pixels are arranged and the rows where the phase difference detection pixels are arranged are alternately disposed, so that the row direction interval and the column direction interval between the image generation pixels become equal to each other. In addition, the row direction interval and the column direction interval between the phase difference detection pixels also become equal to each other.

[Example of Intervals between Phase Difference Detection Pixels]

Figure 5A:
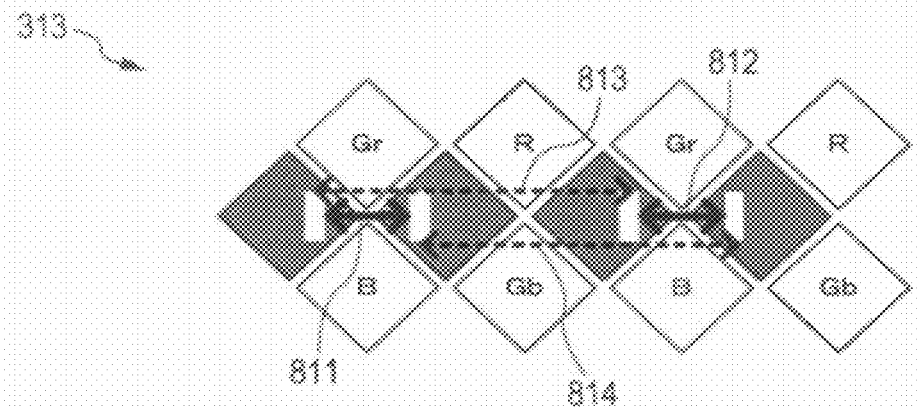
FIGS. 5A and 5B are schematic diagrams illustrating an example of intervals of the phase difference detection pixels in the image sensor according to the first embodiment of the present disclosure.
Figure 5B:
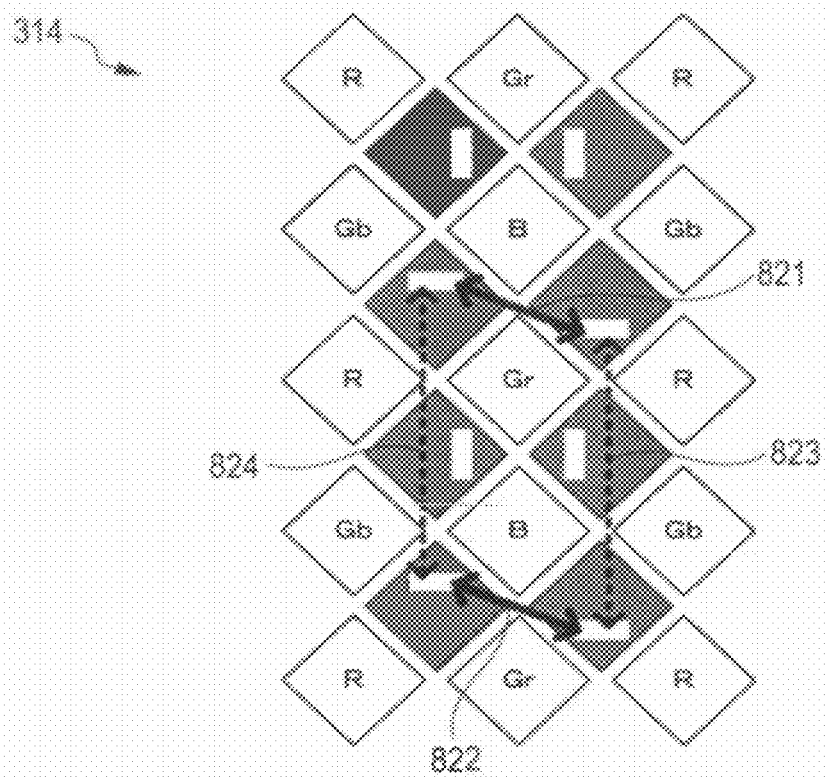

FIGS. 5A and 5B are schematic diagrams illustrating an example of intervals between the phase difference detection pixels in the image sensor 200 according to the first embodiment of the present disclosure.

In FIG. 5A illustrated is an area (area 313) for illustrating an interval between the phase difference detection pixels (hereinafter, referred to as row direction phase difference detection pixels) where pupil splitting is performed in the row direction (left-right direction).

In the area 313, illustrated is an area of pixels of 3 rows×8 columns where the phase difference detection pixels are arranged in one row as the second row from the top and all the other pixels are the image generation pixels. In addition, in the area 313, the distances between the row direction phase difference detection pixels are indicated by the arrows 811 to 814.

As indicated by the arrow 811 and the arrow 812, the distance between the phase difference detection pixels constituting a pair in the row direction phase difference detection pixels becomes the shortest distance by allowing the phase difference detection pixels constituting a pair to be adjacent to each other in the row direction. In addition, as indicated by the arrow 813 and the arrow 814, the phase difference detection pixels which receive the light pupil-split in the same direction are disposed with interposing one phase difference detection pixel which receives the light pupil-split in the other direction. In other words, in the case of detecting the phase difference in the row direction, both of the images constituting a pair are generated from the data of one pixel interval in the row direction, and the images constituting a pair are shifted from each other by one pixel in the row direction.

In FIG. 5B, illustrated is an area (area 314) for illustrating an interval between the phase difference detection pixels (hereinafter, referred to as column direction phase difference detection pixels) where pupil splitting is performed in the column direction (up-down direction).

In the area 314, illustrated is an area of pixels of 9 rows×5 columns where the row direction phase difference detection pixels are arranged in the second and sixth rows from the top, the column direction phase difference detection pixels are arranged in the fourth and eighth rows, and all the other pixels are the image generation pixels. In addition, the area 314, the distances between the column direction phase difference detection pixels are indicated by the arrows 821 to 824.

As indicated by the arrow 821 and the arrow 822, the distance between the phase difference detection pixels constituting a pair in the column direction phase difference detection pixels is slightly larger than the distances indicated by the arrow 811 and the arrow 812 by allowing the phase difference detection pixels constituting a pair to be adjacent to each other in the row direction. In addition, as illustrated by the arrow 823 and the arrow 824, the phase difference detection pixels which receive the light pupil-split in the same direction are disposed with interposing one row direction phase difference detection pixel. In other words, in the case of detecting the phase difference in the column direction, both of the images constituting a pair are generated from the data of one pixel interval in the column direction, and the images constituting a pair are shifted from each other by one pixel in the row direction.

In this manner, in the image sensor 200, the images generated from the phase difference detection pixels where pupil splitting is performed in the row direction and the phase difference detection pixels where pupil splitting is performed in the column direction are generated from one-pixel interval data, respectively. In addition, the images constituting a pair are shifted from each other by one pixel in the row direction or the column direction.

In other words, in the image sensor 200, despite the existence of the lines of only the phase difference detection pixels where pupil splitting is performed in the row direction and the lines of only the phase difference detection pixels where pupil splitting is performed in the column direction, the conditions of the row direction phase difference detection and the conditions of the column direction phase difference detection are substantially the same.

[Example of Data Reading Time in Image Sensor]

FIG. 6 is a schematic diagram illustrating a data reading time in the image sensor 200 according to the first embodiment of the present disclosure.

In addition, in FIG. 6, it is assumed that the image sensor 200 includes the pixels of 4592 columns×3056 rows. In other words, it is assumed that the image generation pixel rows and the phase difference detection pixel rows are 1528 rows, respectively. In addition, in FIG. 6, in the case where the phase difference is detected in the row direction, a pair of the images is configured to be formed by using all the phase difference detection pixels, where pupil splitting is performed in the row direction, arranged in the row used for the phase difference detection. In addition, in the case where the phase difference is detected in the column direction, a pair of the images is configured to be formed by using all the phase difference detection pixels, where pupil splitting is performed in the column direction, arranged in the column used for the phase difference detection.

In FIG. 6, in a graph where the horizontal axis as the axis indicating data reading times, illustrated is a reading time (T1) in the case of reading data from all the rows in the image sensor having the same number of pixels (4592 columns×3056 rows) as that of the image sensor 200. In addition, in FIG. 6, illustrated is a reading time (T2) in the case of reading data from all the rows where the image generation pixels are arranged and one row where the phase difference detection pixels where pupil splitting is performed in the row direction are arranged in the image sensor 200. In addition, in FIG. 6, illustrated is a reading time (T3) in the case of reading data from all the rows where the image generation pixels are arranged and all the rows where the column direction phase difference detection pixels are arranged in the image sensor 200.

Herein, differences among the time T1 to the time T3 are described.

The time T1 indicates the reading time in the case where the data is assumed to be read from all the rows in the image sensor of 4592 columns×3056 rows. As the image sensor performing this reading, for example, assumed is an image sensor where the phase difference detection pixel rows and the image generation pixel rows are alternately disposed similarly to the image sensor 200 and a pair of the column direction phase difference detection pixels are arranged in two rows of the phase difference detection pixel rows. In other words, in the image sensor, the phase difference detection pixels which receive the pupil-split light of the upper half portion or the phase difference detection pixels which receive the pupil-split light of the lower half portion are disposed in all the phase difference detection pixel rows (1528 rows).

In the image sensor, since the column direction phase difference detection pixels are arranged in all the rows, in the case of forming a pair of the images by using all the phase difference detection pixels where pupil splitting is performed in the column direction, which are arranged in the columns used for the phase difference detection, all the phase difference detection pixel rows are read. In other words, the time T1 denotes a time (a time taken to read 3056 rows) necessary for the case of detecting the column direction phase difference in the image sensor.

The time T2 indicates a reading time in the case of performing the row direction phase difference detection and the captured image generation in the image sensor 200. In the case of detecting the row direction phase difference, a pair of the images may be generated by using the data of the phase difference detection pixels in at least one row. In other words, the time T2 denotes a time taken to read data of 1528 rows+1 row.

The time T3 indicates a reading time in the case of performing the column direction phase difference detection and the captured image generation in the image sensor 200. In the case of detecting the column direction phase difference, a pair of the images may be generated by reading data of the pixels in two columns, where a pair of the phase difference detection pixels are arranged, from all the rows (764 rows) where the column direction phase difference detection pixels are arranged. In other words, the time T3 denotes a time taken to read data of 1528 rows+764 rows.

In this manner, in the image sensor 200 according to the first embodiment of the present disclosure, it is possible to detect both of the row direction phase difference and the column direction phase difference, and it is possible to improve the data reading speed in the case of detecting the column direction phase difference.

In this manner, according to the first embodiment of the present disclosure, the row direction phase difference detection and the column direction phase difference detection are performed in substantially the same conditions, and the phase difference detection may be performed at arbitrary positions. Therefore, it is possible to improve the reading speed in the case of detecting the column direction phase difference. In addition, since the row direction interval and the column direction interval between the image generation pixels are the same, it is possible to improve image quality of the captured image.

<2. Second Embodiment>

In the first embodiment of the present disclosure, described is the example where the phase difference detection pixels where pupil splitting is performed in the reading direction (row direction) and the phase difference detection pixels where pupil splitting is performed in the direction (column direction) perpendicular to the reading direction are alternately arranged in each line in the image sensor 200. By doing so, it is possible to improve the data reading speed in the case of detecting the column direction phase difference.

However, in the image sensor 200, since the pixel data are read in units of rows, in comparison with the case of detecting the row direction phase difference, the reading time in the case of detecting the column direction phase difference becomes long. By doing so, in comparison with the frame rate in the case of detecting the row direction phase difference, the frame rate in the case of detecting the column direction phase difference becomes low.

Therefore, in a second embodiment of the present disclosure, an example where the reading time in the case of detecting the column direction phase difference is allowed to be substantially the same as the time in the case of the row direction by reading the data of the phase difference detection pixels detecting the column direction phase difference in units of columns will be described with reference to FIGS. 7 to 11.

[Example of Basic Configuration of Image Sensor]

FIG. 7 is a block diagram illustrating an example of a basic configuration of an image sensor 500 according to the second embodiment of the present disclosure. In addition, since the functional configuration of the imaging apparatus according to the second embodiment of the present disclosure is the same as the configuration of the imaging apparatus 100 illustrated in FIG. 1 except that the image sensor 200 is replaced with the image sensor 500, the description thereof is omitted herein.

The image sensor 500 includes a pixel array unit 400, a controller 510, a first vertical driving circuit 520, a column processing unit 531, an output buffer 532, and a first horizontal driving circuit 535. In addition, the image sensor 500 includes a second horizontal driving circuit 550, a row processing unit 560, an output buffer 562, and a second vertical driving circuit 570.

The pixel array unit 400 is a unit where phase difference detection pixels (row direction phase difference detection pixels and column direction phase difference detection pixels) and image generation pixels are regularly arranged. The image generation pixels arranged in the pixel array unit 400 are connected to vertical selection lines 430 and vertical signal lines 440. In addition, similarly to the image generation pixels, the row direction phase difference detection pixels arranged in the pixel array unit 400 are connected to the vertical selection lines 430 and the vertical signal lines 440. On the other hand, the column direction phase difference detection pixels arranged in the pixel array unit 400 are connected to horizontal selection lines 450 and horizontal signal lines 460. In addition, with respect to the vertical selection lines 430 and the horizontal selection lines 450, although the description is made under the assumption that one line is connected to one pixel, according to a circuit configuration of the pixels arranged in the pixel array unit 400, a plurality of lines or a plurality of pixels may be connected.

The controller 510 controls operations of each of the components of the image sensor 500 based on signals supplied from external portions of the image sensor 500. The controller 510 functions as, for example, a timing generator for generating various timing signals for operating each of the components of the image sensor 500. The controller 510 supplies the generated timing signals of each of the components or control signals of each of the components to the first vertical driving circuit 520, the first horizontal driving circuit 535, the column processing unit 531, the second horizontal driving circuit 550, the row processing unit 560, and the second vertical driving circuit 570.

The first vertical driving circuit 520 sequentially performs a selective scan in the vertical direction (column direction) in units of rows through the vertical selection line 430 on the rows where the image generation pixels are arranged and the rows where the row direction phase difference detection pixels are arranged in the pixel array unit 400. The first vertical driving circuit 520 is constructed with, for example, a shift register. In addition, the first vertical driving circuit 520 is an example of the first driving unit disclosed in the embodiments of the present disclosure. In addition, the vertical selection line 430 is an example of the first selection line disclosed in the embodiments of the present disclosure.

The column processing unit 531 performs various signal processes on the output analog signal of each of the pixel columns where the image generation pixels and the row direction phase difference detection pixels are arranged in the pixel array unit 400. In other words, the column processing unit 531 performs various signal processes on the analog signal output through the vertical signal line 440 from each of the pixels (image generation pixels and row direction phase difference detection pixels) in the row selected by the first vertical driving circuit 520. For example, the column processing unit 531 performs a CDS (Correlated Double Sampling) process for removing noise, an AD (Analog Digital) conversion process for converting an analog signal into a digital signal, or the like as the signal process. The column processing unit 531 supplies the electrical signal which is subject to the signal process through the signal line 538 to the output buffer 532. In addition, the column processing unit 531 is an example of the first signal processing unit disclosed in the embodiments of the present disclosure. In addition, the vertical signal line 440 is an example of the first signal line disclosed in the embodiments of the present disclosure.

The output buffer 532 amplifies the electrical signal supplied from the column processing unit 531 and outputs the electrical signal through the signal line 539 to an external portion of the image sensor 500.

The first horizontal driving circuit 535 sequentially performs a selective scan on circuit portions for the pixel columns in the column processing unit 531. The first horizontal driving circuit 535 is constructed with, for example, a shift register, an address decoder, or the like. The first horizontal driving circuit 535 sequentially performs the a selective scan on the circuit portions of the column processing unit 531, so that the first horizontal driving circuit 535 allows the electrical signals, which are subject to the signal process for each of the pixel columns in the column processing unit 531, to be sequentially output through the signal line 538 to the output buffer 532.

The second horizontal driving circuit 550 sequentially performs a selective scan in the horizontal direction (row direction) in units of columns through the horizontal selection line 450 on the columns where the column direction phase difference detection pixels are arranged in the pixel array unit 400. Similarly to the first vertical driving circuit 520, the second horizontal driving circuit 550 is constructed with, for example, a shift register. In addition, the second horizontal driving circuit 550 is an example of the second driving unit disclosed in the embodiments of the present disclosure. In addition, the horizontal selection line 450 is an example of the second selection line disclosed in the embodiments of the present disclosure.

The row processing unit 560 performs various signal processes on the output analog signal of each of the pixel rows where the column direction phase difference detection pixels are arranged in the pixel array unit 400. In other words, the row processing unit 560 performs various signal processes on the analog signal output through the horizontal signal line 460 from each of the pixels (column direction phase difference detection pixels) in the column selected by the second horizontal driving circuit 550. In addition, since the row processing unit 560 is the same as the column processing unit 531 except that the to-be-processed target pixels are different, the description of the row processing unit 560 is omitted herein. The row processing unit 560 supplies the electrical signal, which is subject to the signal process, through the signal line 568 to the output buffer 562. In addition, the row processing unit 560 is an example of the second signal processing unit disclosed in the embodiments of the present disclosure. In addition, the horizontal signal line 460 is an example of the second signal line disclosed in the embodiments of the present disclosure.

The output buffer 562 amplifies the electrical signal supplied from the row processing unit 560 and outputs the electrical signal through the signal line 569 to an external portion of the image sensor 500.

The second vertical driving circuit 570 sequentially performs a selective scan on circuit portions for the pixel rows in the row processing unit 560. Since the second vertical driving circuit 570 is the same as the first horizontal driving circuit 535 except that the to-be-processed target pixels are different, the description of the second vertical driving circuit 570 is omitted herein.

In this manner, the image sensor 500 includes a second horizontal driving circuit 550, a second vertical driving circuit 570, a row processing unit 560, and an output buffer 562 in order to drive the column direction phase difference detection pixels. In addition, the basic configuration of the image sensor 200 according to the first embodiment of the present disclosure is the same as the basic configuration illustrated in FIG. 7 except that the second horizontal driving circuit 550, the second vertical driving circuit 570, the row processing unit 560, and the output buffer 562 are not included.

[Example of Arrangement of Pixels in Image Sensor]

FIG. 8 is a schematic diagram illustrating an example of the arrangement of the pixels in the image sensor 500 according to the second embodiment of the present disclosure. In other words, FIG. 8 is a schematic diagram illustrating the arrangement of the pixels in the pixel array unit 400 illustrated in FIG. 7.

In FIG. 8, with respect to the X and Y axes, the same description as that of FIG. 3 is made. In addition, the up, down, left, and right directions of the pixel array unit 400 illustrated in FIG. 7 are the same as those of FIG. 8.

In FIG. 8, for the convenience of description, the description is made by using an area (area 410) including a portion of pixels (pixels of 20 rows×20 columns) among the pixels constituting the pixel array unit 400 in the image sensor 500. In addition, the arrangement of the pixels in the pixel array unit 400 is an arrangement where the pixel arrangement illustrated in the area 410 is set as one unit and the pixel arrangements (the pixel arrangements corresponding to the area 410) corresponding to the units are repetitively disposed in the X axis direction and the Y axis direction. In addition, since the area 410 is the same as the area 210 illustrated in FIG. 3 except that the arrangement of the pixels is different, only the different points will be described in FIG. 8.

In the image sensor 500, in addition to the phase difference detection pixels 231 to 234, the R pixel 241, the G pixel 242, the G pixel 243, and the B pixel 244 illustrated in FIG. 3 and FIGS. 4A and 4B, the pixels (the unused pixels 411) which do not generate the electrical signal are arranged. The unused pixels 411 are indicated by gray diamond shapes in the area 410 of FIG. 8.

Similarly to the area 210, in the area 410, the rows where the image generation pixels are arranged and the rows where the phase difference detection pixels are arranged are alternately disposed. However, in the area 410, in the rows where the phase difference detection pixels are arranged, the arrangement pattern of the row direction phase difference detection pixel rows and the column direction phase difference detection pixel rows is different from that of the area 210. In the area 410, in the rows where the phase difference detection pixels are arranged, one row of the row direction phase difference detection pixel rows and two rows of the column direction phase difference detection pixel rows are alternately arranged.

In addition, the area 410 is different from the area 210 in terms of the arrangement pattern of the phase difference detection pixels in the rows where the phase difference detection pixels are arranged. In the row direction phase difference detection pixel rows, the two phase difference detection pixels constituting a pair and the unused pixels 411 are alternately disposed in the row direction. In addition, the unused pixels 411 which are arranged in the row direction phase difference detection pixel rows are examples of the first pixels disclosed in the embodiments of the present disclosure.

In addition, with respect to the column direction phase difference detection pixel rows, the column direction phase difference detection pixels are arranged only in the columns where the unused pixels 411 are arranged in the row direction phase difference detection pixel rows, and the unused pixels 411 are arranged at the other positions. In addition, in the two consecutive rows of the column direction phase difference detection pixel rows which are consecutive in the column direction, the column direction phase difference detection pixels are arranged so that the column direction phase difference detection pixels constituting a pair are adjacent to each other in the column direction. In addition, the unused pixels 411 which are arranged in the column direction phase difference detection pixel rows are examples of the second pixels disclosed in the embodiments of the present disclosure.

In other words, in the column direction of the area 410, the phase difference detection pixels are arranged so that the row direction phase difference detection pixels and the column direction phase difference detection pixels are not arranged in the same column. In addition, the arrangement is performed so that the distance between the phase difference detection pixels constituting a pair becomes the shortest distance in any one of the row direction phase difference detection pixels and the column direction phase difference detection pixels. In addition, in both of the row direction phase difference detection pixels and the column direction phase difference detection pixels, in the direction where the phase difference is to detected, one of the unused pixels 411 is disposed between a pair of the phase difference detection pixels and a pair of the phase difference detection pixels. In other words, in the image sensor 500, although the phase difference detection pixels constituting a pair are arranged in one row or one column, the phase difference detection pixels are arranged so that the row direction phase difference detection and the column direction phase difference detection are performed in the same conditions.

[Example of Interconnection in Image Sensor]

FIG. 9 is a schematic diagram illustrating an example of selection lines and signal lines interconnected to the pixels in the image sensor 500 according to the second embodiment of the present disclosure.

In FIG. 9, illustrated are the area 410 illustrated in FIG. 8 and the interconnection lines (the vertical selection lines 430, the vertical signal lines 440, the horizontal selection lines 450, and the horizontal signal lines 460) are connected to the pixels in the area. In addition, in a front surface type image sensor where interconnection lines are formed in a layer between the microlens of the pixel and the light receiving device, the interconnection lines are configured in a layout so as to penetrate the corners of the pixels in order not to block the subject light. However, in FIG. 9, for the convenience of description, the interconnection lines are illustrated as straight lines.

The vertical selection lines 430 are interconnected to the rows where the image generation pixels are arranged and the rows where the row direction phase difference detection pixels are arranged. In addition, the vertical selection lines 430 are connected to the image generation pixels and the row direction phase difference detection pixels among the interconnected pixels, and the vertical selection lines 430 are not connected to the unused pixels 411 in the rows where the row direction phase difference detection pixels are arranged. In other words, the signals supplied though the vertical selection lines 430 from the first vertical driving circuit 520 are supplied to only the image generation pixels and the row direction phase difference detection pixels.

The vertical signal lines 440 are interconnected to the columns where the image generation pixels are arranged and the columns where the row direction phase difference detection pixels are arranged. In addition, the vertical signal lines 440 are connected to the image generation pixels and the row direction phase difference detection pixels among the interconnected pixels, and the vertical signal lines 440 are not connected to the unused pixels 411. In other words, the first horizontal driving circuit 535 and the column processing unit 531 perform output control or signal processes on the electrical signals generated by the image generation pixels and the row direction phase difference detection pixels.

The horizontal selection lines 450 are interconnected to the columns where the column direction phase difference detection pixels are arranged. In addition, the horizontal selection lines 450 are connected to only the column direction phase difference detection pixels among the interconnected pixels, and the horizontal selection lines 450 are not connected to the unused pixels 411. In other words, the signals supplied though the horizontal selection lines 450 from the second horizontal driving circuit 550 are supplied to only the column direction phase difference detection pixels.

The horizontal signal lines 460 are interconnected to the rows where the column direction phase difference detection pixels are arranged. In addition, the horizontal signal lines 460 are connected to only the column direction phase difference detection pixels among the interconnected pixels, and the horizontal signal lines 460 are not connected to the unused pixels 411. In other words, the second vertical driving circuit 570 and the row processing unit 560 perform output control or signal processes on the electrical signals generated by the column direction phase difference detection pixels.

In this manner, the image generation pixels and the row direction phase difference detection pixels are driven in units of rows based on the signals supplied though the vertical selection lines 430 to output the electrical signals generated from the received subject light through the vertical signal lines 440. In addition, the column direction phase difference detection pixels are driven in units of columns based on the signals supplied though the horizontal selection lines 450 to output the electrical signals generated from the received subject light through the horizontal signal lines 460.

In other words, in the image sensor 500, the horizontal selection lines 450 and the horizontal signal lines 460 are provided, so that the reading in the pupil-splitting direction (the column direction) may be performed on the column direction phase difference detection pixels. In addition, according to the interconnection illustrated in FIG. 9, one selection line and one signal line are interconnected to one pixel. In other words, it is possible to drive the column direction phase difference detection pixels in units of columns while maintaining the number of interconnection lines of one pixel to be equal to that in the image sensor of the related art.

In addition, since the unused pixels 411 have the same configuration as the phase difference detection pixels (the microlens, the light blocking layer, the light receiving device, and the like are the same), interconnection lines are not connected to the unused pixels 411, such that the electrical signal may not be generated. However, the arrangement of the pixels in the image sensor may be configured to be uniform similarly to FIGS. 4A and 4B. Therefore, it is possible to improve image quality.

[Example of Timing in Image Sensor]

FIGS. 10A and 10B are timing charts illustrating one example of operations during the period of detecting the column direction phase difference and performing focusing and a timing chart illustrating one example of operations during the period of performing the same operations by using the image sensor described with respect to the time T1 of FIG. 6 in the second embodiment of the present disclosure.

In addition, in FIGS. 10A and 10B, it is assumed that the live view image capturing and the focus adjustment (driving of the focus lens 113) are repetitively performed in order to display a live view on the display unit 182. In addition, in FIGS. 10A and 10B, for the convenience of description, similarly to FIG. 6, it is assumed that a pair of the images are formed by using all the column direction phase difference detection pixels arranged in the columns used for the phase difference detection. In addition, the length of the horizontal axis indicating the periods is schematically illustrated.

FIG. 10A illustrates a timing chart of one example of operations during the period of detecting the column direction phase difference and performing focusing in the image sensor described in association with the time T1 of FIG. 6. The timing chart illustrates a timing (image sensor output timing 691) of outputting the image-captured signal from the image sensor and a (focus determination) timing (focus alignment determination timing 692) of calculating a focus shift amount by detecting the phase difference. In addition, the timing chart illustrates a timing (lens driving timing 693) of driving the focus lens based on the focus shift amount.

Herein, the operations during the period of detecting the column direction phase difference and performing focusing in the imaging apparatus including the image sensor described with respect to the time T1 of FIG. 6 are described. The image sensor, the phase difference detection pixel rows and the image generation pixel rows are alternately disposed, and a pair of the phase difference detection pixels where pupil splitting is performed in the up-down direction are repetitively arranged in the column direction. Therefore, as illustrated in association with the time T1 of FIG. 6, the pixel signals are read from all the rows in the image sensor. With respect to the image sensor output timing 691, the reading from the image generation pixel rows is schematically indicated by illustrating rectangles of which the inner portion is white, and the reading from the phase difference detection pixel rows is schematically indicated by rectangles with mesh patterns attached therein in the inner portion thereof. In other words, FIG. 6A illustrates the output timing by allowing rectangles of which the inner portion is white and rectangles with mesh patterns attached therein to be alternately continued and indicates that the reading from the phase difference detection pixel rows and the reading from the image generation pixel rows are alternately performed. In addition, FIG. 6A illustrates the timing of reading signals of pixels in the (N−1)-th and N-th live view image capturing periods.

If the signal reading from the pixels in the image sensor is finished, a pair of the images is formed based on the signals of the phase difference detection pixels in the longitudinal direction, and the focus alignment determination for calculating the focus shift amount is performed. The focus alignment determination is performed after the reading of all the phase difference detection pixel rows necessary to generate the signals for forming a pair of the images is finished. In other words, in the case of forming a pair of the images by using all the column direction phase difference detection pixels arranged in the columns used for the phase difference detection, the forming of a pair of the images is performed after the signal reading of the pixels in the image sensor is entirely finished. With respect to the focus alignment determination timing 692, the timing of the focus alignment determination is indicated by a hatched rectangle.

If the focus alignment determination is finished, the focus lens is driven based on the calculated focus shift amount. With respect to the lens driving timing 693, the driving timing of the lens is indicated by a small-dotted rectangle.

In other words, in the case illustrated in FIG. 10A, since all the phase difference detection pixel rows as well as all the image generation pixel rows are necessarily read in order to detect the column direction phase difference, the time of the reading from the image sensor is increased. In addition, since the focus alignment determination is performed necessarily after the reading of the phase difference detection pixel rows is finished, if the reading from the image sensor is not entirely finished, the focus alignment determination may not be performed. Therefore, in the case of detecting the column direction phase difference, the frame rate is decreased in comparison with the case of detecting the phase difference in the row direction.

FIG. 10B illustrates a timing chart of one example of operations during the period of detecting the column direction phase difference and performing focusing in the image sensor 500 according to the second embodiment of the present disclosure. The timing chart illustrates a timing (image generation pixel/row direction phase difference detection pixel output timing 610) of outputting an image-captured signal from the image generation pixels and the row direction phase difference detection pixels. In addition, the timing chart illustrates a timing (column direction phase difference detection pixel output timing 620) of outputting an image-captured signal from the column direction phase difference detection pixels, a focus alignment determination timing (focus alignment determination timing 630), and a lens driving timing (lens driving timing 640).

In addition, in FIG. 10B, the time taken to perform the focus alignment determination is set to be equal to that of FIG. 10A. In addition, the time taken to drive the lens is also set to be equal to that of FIG. 10A.

Herein, the operations during the period of detecting the column direction phase difference and performing focusing in the imaging apparatus according to the second embodiment of the present disclosure are described. In the image sensor 500, the signal reading from the image generation pixels is performed by the first vertical driving circuit 520, the column processing unit 531, and the first horizontal driving circuit 535. On the other hand, the signal reading from the column direction phase difference detection pixels is performed by the second horizontal driving circuit 550, the row processing unit 560, and the second vertical driving circuit 570. In other words, the signal reading from the image generation pixels and the signal reading from the column direction phase difference detection pixels may be simultaneously performed. With respect to the image generation pixel/row direction phase difference detection pixel output timing 610, the continuous reading from the image generation pixel rows is indicated by rectangles of which the inner portion is white. In addition, with respect to the column direction phase difference detection pixel output timing 620, in the case where the reading from the column direction phase difference detection pixels is started at the same time as the start of the reading from the image generation pixel rows, so that the reading is finished in a short time, the timing thereof is indicated by rectangles with a large number of fine dots added thereto.

If the pixel signal reading from the column direction phase difference detection pixels is finished, a pair of the images are formed based on the read signals, and the focus alignment determination for calculating the focus shift amount is performed. In other words, in the imaging apparatus according to the second embodiment of the present disclosure, the focus alignment determination may be started before the signal reading of the image generation pixels is finished. In addition, since the focus alignment determination is finished in a shorter time than the signal reading of the image generation pixels, the focus alignment determination is finished before the signal reading of the image generation pixels is finished. With respect to the focus alignment determination timing 630, the timing of the focus alignment determination is indicated by a hatched rectangle.

If the signal reading of the image generation pixels is finished, the focus lens is driven based on the calculated focus shift amount. In the case illustrated in FIG. 10B, since the focus alignment determination is finished before the signal reading of the image generation pixels is finished, the focus lens may be driven just after the signal reading of the image generation pixels is finished. With respect to the lens driving timing 693, the driving timing of the lens is indicated by a small-dotted rectangle.

In this manner, in the second embodiment of the present disclosure, in the case of detecting the column direction phase difference, it is possible to reduce the time taken to perform the signal reading of the image generation pixels. In addition, the pixel signal reading from the column direction phase difference detection pixels may be finished in a short time in the middle of the reading of the image generation pixels, so that it is possible to perform the focus alignment determination in the middle of the signal reading of the image generation pixels. In addition, since the focus alignment determination is finished in the middle of the signal reading of the image generation pixels, the driving of the lens may be started just after the signal reading of the image generation pixels is finished.

Therefore, in the second embodiment of the present disclosure, in the imaging device having the image generation pixels and the phase difference detection pixels, in the case of detecting the column direction phase difference, it is possible to improve the reading speed. In other words, in the case of detecting the column direction phase difference, it is possible to improve a frame rate.

<3. Modified Example>

In the first and second embodiment of the present disclosure, the example where the pixel has a shape of a square having a shape which is rotated by 45° with respect to the X axis direction is described. However, the present disclosure is not limited thereto, and it may also be applied to pixels having various shapes.

Therefore, an example where the pixel has a shape of an octagon will be described with reference to FIG. 11.

[Example of Interconnection in Image Sensor]

Figure 11:
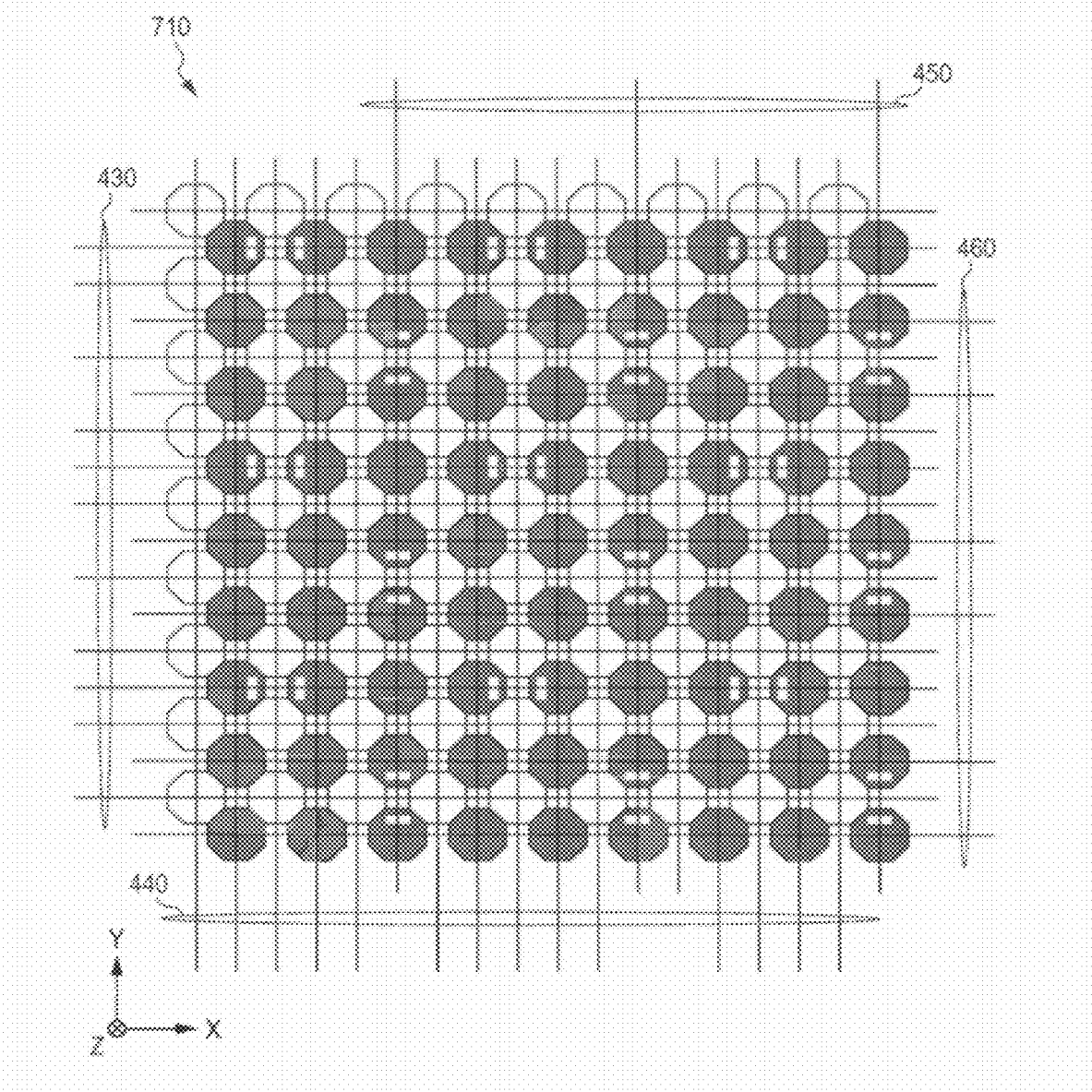
FIG. 11 is a schematic diagram illustrating an example of a case where a shape of an image is octagon as a modified example of the second embodiment of the present disclosure.

FIG. 11 is a schematic diagram illustrating an example where the pixel has a shape of an octagon according to a modified example of the second embodiment of the present disclosure.

In FIG. 11, illustrated is an area (area 710) in a portion of the image sensor including the pixels having a shape of an octagon instead of the pixels having a shape of a 45°-rotated square illustrated in FIG. 9. In addition, the area 710 illustrated in FIG. 11 corresponds to the area 410 illustrated in FIG. 9.

As illustrated in FIG. 11, even in the case where pixels other than the pixels having a shape of a 45°-rotated square are arranged, the phase difference detection pixels may be arranged similarly to the embodiments of the present disclosure. In other words, the embodiments of the present disclosure may be applied irrespective of the shape of the pixel.

In this manner, according to the embodiment of the present disclosure, in the imaging device having the image generation pixels and the phase difference detection pixels, it is possible to improve the reading speed in the case of detecting the column direction phase difference (the column direction phase difference detection process). Therefore, in the case of capturing live view image-s while adjusting focus by detecting the column direction phase difference, it is possible to improve the frame rate.

In addition, in the embodiment of the present disclosure, the description is made under the assumption that the color filters included in the image generation pixels are color filters of three primary colors (RGB), but the present disclosure is not limited thereto. For example, even in the case where color filters of complementary colors are included in the image generation pixels, this may be applied similarly to the present disclosure. In addition, even in the case where pixels (for example, an imaging device where pixels for blue, pixels for green, and pixels for red are arranged in a stack in the optical axis direction) which detect all light having a wavelength in the visible light band by an area of one pixel are the image generation pixels, the embodiments of the present disclosure may be similarly applied thereto.

In addition, in the embodiment of the present disclosure, the description is made under the assumption that the phase difference detection pixel receives one of the two pupil-split light beams the present disclosure is not limited thereto. For example, even in the case where two light receiving devices are provided and the phase difference detection pixels are arranged so that the pupil-split light beams may be separately received by the light receiving devices, the embodiments of the present disclosure may be applied thereto. Accordingly, it is possible to improve the read speed with respect to the image sensor.

In addition, in the second embodiment of the present disclosure, the description is made on the example where one selection line and one signal line are interconnected to one pixel, the present disclosure is not limited thereto. In the case where no problem occurs when a plurality of the selection lines and a plurality of the signal lines are interconnected thereto, a plurality of the lines may be interconnected. For example, in the case of a rear surface type image sensor where an interconnection layer is disposed at the rear side of a light receiving device (the side opposite to the light incidence side), it is considered that an increase in the number of interconnection lines in the phase difference detection pixel rows does not influence the reception of the subject light. In this case, two selection lines and two signal lines are interconnected to the row and the column of the phase difference detection pixels, so that the unused pixels 411 illustrated in FIGS. 8 and 9 may be used as the row direction phase difference detection pixels or the column direction phase difference detection pixels.

For example, it may be considered that the unused pixels 411 in the column of the row direction phase difference detection pixels illustrated in FIG. 9 are used as the row direction phase difference detection pixels and the vertical selection lines 430 and the vertical signal lines 440 are connected thereto. In addition, it may also be considered that the pixel arrangement of the phase difference detection pixels illustrated in FIG. 3 is used, the vertical selection lines 430 and the vertical signal lines 440 are connected to the row direction phase difference detection pixels, and the horizontal selection lines 450 and the horizontal signal lines 460 are connected to the column direction phase difference detection pixels.

In addition, the embodiments of the present disclosure are examples for embodying the present disclosure, and as clarified in the embodiments of the present disclosure, and matters in the embodiments of the present disclosure have a corresponding relationship with specific matters in the embodiment of the present disclosure. Similarly, specific matters in the embodiment of the present disclosure and matters in the embodiments of the present disclosure denoted by the same names have a corresponding relationship with each other. However, the present disclosure is not limited to the embodiments, and various modifications of the embodiments may be embodied in the scope of the present disclosure without departing from the spirit of the present disclosure.

In addition, the process procedures described in the embodiments of the present disclosure may be regarded as a method having a series of procedures, or regarded as a program for allowing a computer to execute a series of procedures or a recording medium which stores the program. As the recording medium, for example, a CD (Compact Disc), an MD (Mini Disc), a DVD (Digital Versatile Disc), a memory card, a Blu-ray Disc (registered trade mark), or the like may be used.

The present disclosure contains subject matter related to that disclosed in Japanese Priority Patent Application JP 2010-275201 filed in the Japan Patent Office on Dec. 10, 2010, the entire contents of which are hereby incorporated by reference.

What is claimed is:

1. An imaging apparatus comprising:
   one or more processors operable to:
   generate an image based on signals generated by a plurality of image generation pixels; and
   perform focus alignment based on signals generated by a plurality of phase difference detection pixels;
   wherein the plurality of image generation pixels are arranged in a first direction to define first lines of image generation pixels and the plurality of phase difference detection pixels are arranged in the first direction to define second lines of phase difference detection pixels,
   wherein the first lines of image generation pixels and the second lines of phase difference detection pixels are alternately arranged in a second direction perpendicular to the first direction,
   wherein the first lines and the second lines adjacent to the first lines overlap each other by portions thereof in the second direction, and wherein the second lines comprise third lines of phase difference detection pixels each operable to receive pupil split light in the first direction and fourth lines of phase difference detection pixels each operable to receive pupil split light in the second direction, wherein the third lines of phase difference detection pixels and the fourth lines of phase difference detection pixels are alternately arranged in the second direction.

2. The imaging apparatus according to claim 1, wherein in the first lines of image generation pixels and the second lines of phase difference detection pixels adjacent to the first lines of image generation pixels are alternately arranged in the second direction to overlap each other by half a pixel.

3. The imaging apparatus according to claim 1, wherein the plurality of image generation pixels and the plurality of phase difference detection pixels are arranged in a tilted pixel arrangement.

4. The imaging apparatus according to claim 1, wherein the first direction is a reading direction when the signals generated by the plurality of phase difference detection pixels and the plurality of image generation pixels are read from the plurality of phase difference detection pixels and the plurality of image generation pixels.

5. The imaging apparatus according to claim 4, wherein the third lines of phase difference detection pixels comprise a plurality of pairs of first direction phase difference detection pixels operable to receive a pair of subject light beams pupil-split in the first direction, each of the pairs of first direction phase difference detection pixels arranged in the first direction to be adjacent to each other, and wherein the fourth lines of phase difference detection pixels comprise a plurality of pairs of second direction phase difference detection pixels operable to receive a pair of subject light beams pupil-split in the second direction, each of the pairs of second direction phase difference detection pixels arranged in the first direction to be adjacent to each other.

6. The imaging apparatus according to claim 1, wherein the first direction is a reading direction when the signals generated by the first direction phase difference detection pixels and the signals generated by the image generation pixels are read from the first direction phase difference detection pixels and the image generation pixels, and wherein the second direction is a reading direction when the signals generated by the second direction phase difference detection pixels are read from the second direction phase difference detection pixels.

7. The imaging apparatus according to claim 6, wherein the third lines of phase difference detection pixels comprise a plurality of pairs of the first direction phase difference detection pixels operable to receive a pair of subject light beams pupil-split in the first direction, each of the pairs of first direction phase difference detection pixels arranged in the first direction to be adjacent to each other, and a plurality of pairs of the first direction phase difference detection pixels are repetitively arranged interposing a first pixel which is not used for the first direction phase difference detection, and wherein the fourth lines of phase difference detection pixels comprise, the second direction phase difference detection pixels arranged at positions perpendicular to the position where the first pixel is arranged, and second pixels which are not used for the second direction phase difference detection arranged at positions other than positions perpendicular to the position where the first pixel is arranged.

8. The imaging apparatus according to claim 7, wherein the third lines of phase difference detection pixels comprise the first direction phase difference detection pixels arranged in one row, and wherein the fourth lines of phase difference detection pixels comprise the second direction phase difference detection pixels arranged in two rows, and in the fourth lines arranged in the two rows, a pair of the second direction phase difference detection pixels operable to receive a pair of the subject light beams pupil-split in the second direction are arranged in the second direction to be adjacent to each other.

9. The imaging apparatus according to claim 1, further comprising:

first signal lines which are interconnected in the second direction at the positions where the first direction phase difference detection pixels and the plurality of image generation pixels are arranged in order to sequentially transmit signals generated by the first direction phase difference detection pixels and the plurality of image generation pixels and which are connected to the specific direction phase difference detection pixels and the image generation pixels;

first selection lines which are interconnected in the first direction to the first lines of image generation pixels and the third lines of phase difference detection pixels in order to select the rows which sequentially transmit signals generated by the first direction phase difference detection pixels and the plurality of image generation pixels and which are connected to the specific direction phase difference detection pixels and the image generation pixels;

second signal lines which are interconnected in the first direction to the fourth lines of phase difference detection pixels to sequentially transmit the signals generated by the second direction phase difference detection pixels and which are connected to the perpendicular direction phase difference detection pixels; and second selection lines which are interconnected in the second direction at the positions where the second direction phase difference detection pixels are arranged to select the second direction position where the signals generated by the perpendicular direction phase difference detection pixels are sequentially transmitted and which are connected to the second direction phase difference detection pixels.

10. The imaging apparatus according to claim 9, further comprising:

a first driving unit operable to drive the first direction phase difference detection pixels and the plurality of image generation pixels through the first selection lines;

a first signal processing unit operable to performs a signal process on the signals generated by the first direction phase difference detection pixels and the plurality of image generation pixels transmitted by the first signal lines;

a second driving unit operable to drive the second direction phase difference detection pixels through the second selection lines; and a second signal processing unit operable to perform a signal process on the signals generated by the second direction phase difference detection pixels transmitted by the second signal lines.

11. A method for imaging comprising:

in an imaging device comprising a pixel array unit:
generating an image based on signals generated by a plurality of image generation pixels; and performing focus alignment based on signals generated by a plurality of phase difference detection pixels;

wherein the plurality of image generation pixels are arranged in a first direction to define first lines of image generation pixels and the plurality of phase difference detection pixels are arranged in a second direction perpendicular to the first direction to define second lines of phase difference detection pixels, wherein the first lines of image generation pixels and the second lines of phase difference detection pixels are alternately arranged in the second direction;

wherein the second lines comprise third lines of phase difference detection pixels operable to receive pupil split light in the first direction and fourth lines of phase difference detection pixels operable to receive pupil split light in the second direction, wherein the third lines of phase difference detection pixels and the fourth lines of phase difference detection pixels are alternately arranged in the second direction, and wherein the first direction is a reading direction when the signals generated by the plurality of phase difference detection pixels and the plurality of image generation pixels are read from the plurality of phase difference detection pixels and the plurality of image generation pixels.

12. An imaging apparatus comprising:

one or more processors operable to:

generate an image based on signals generated a plurality of image generation pixels; and perform focus alignment based on signals generated by a plurality of phase difference detection pixels;

wherein the plurality of image generation pixels are arranged in a first direction to define first lines of image generation pixels and the plurality of phase difference detection pixels are arranged in the first direction to define second lines of phase difference detection pixels, wherein the first lines of image generation pixels and the second lines of phase difference detection pixels are alternately arranged in a second direction perpendicular to the first direction, wherein the first lines and the second lines adjacent to the first lines overlap each other by portions thereof in the second direction, and wherein the second lines comprise third lines of phase difference detection pixels operable to receive pupil split light in the first direction and fourth lines of phase difference detection pixels operable to receive pupil split light in the second direction, wherein the third lines of phase difference detection pixels and the fourth lines of phase difference detection pixels are alternately arranged in the second direction, wherein the third lines of phase difference detection pixels comprise a plurality of pairs of first direction phase difference detection pixels operable to receive a pair of subject light beams pupil-split in the first direction, each of the pairs of first direction phase difference detection pixels arranged in the first direction, and wherein the plurality of pairs of the first direction phase difference detection pixels are repetitively arranged interposing a first pixel which is not used for the first direction phase difference detection, and wherein the fourth lines of phase difference detection pixels comprise second direction phase difference detection pixels arranged at positions perpendicular to the position where the first pixel is arranged, and wherein second pixels which are not used for the second direction phase difference detection are arranged at positions other than positions perpendicular to the position where the first pixel is arranged.

13. The imaging apparatus according to claim 11, further comprising:

first signal lines which are interconnected in the second direction at the positions where the first direction phase difference detection pixels and the plurality of image generation pixels are arranged in order to sequentially transmit signals generated by the first direction phase difference detection pixels and the plurality of image generation pixels and which are connected to the specific direction phase difference detection pixels and the image generation pixels;

first selection lines which are interconnected in the first direction to the first lines of image generation pixels and the third lines of phase difference detection pixels in order to select the rows which sequentially transmit signals generated by the first direction phase difference detection pixels and the plurality of image generation pixels and which are connected to the specific direction phase difference detection pixels and the image generation pixels;

second signal lines which are interconnected in the first direction the fourth lines of phase difference detection pixels to sequentially transmit the signals generated by the second direction phase difference detection pixels and which are connected to the perpendicular direction phase difference detection pixels; and second selection lines which are interconnected in the second direction at the positions where the second direction phase difference detection pixels are arranged to select the second direction position where the signals generated by the perpendicular direction phase difference detection pixels are sequentially transmitted and which are connected to the second direction phase difference detection pixels.

14. The imaging apparatus according to claim 11, further comprising:

a first driving unit operable to drive the first direction phase difference detection pixels and the plurality of image generation pixels through the first selection lines;

a first signal processing unit operable to perform a signal process on the signals generated by the first direction phase difference detection pixels and the plurality of image generation pixels transmitted by the first signal lines;

a second driving unit operable to drive the second direction phase difference detection pixels through the second selection lines; and a second signal processing unit operable to perform a signal process on the signals generated by the second direction phase difference detection pixels transmitted by the second signal lines.

15. The imaging apparatus according to claim 12, wherein the third lines of phase difference detection pixels comprise the first direction phase difference detection pixels arranged in one row, and wherein the fourth lines of phase difference detection pixels comprise the second direction phase difference detection pixels arranged in two rows, and in the fourth lines arranged in the two rows, a pair of the second direction phase difference detection pixels operable to receive a pair of the subject light beams pupil-split in the second direction are arranged in the second direction to be adjacent to each other.

16. The imaging apparatus according to claim 12, wherein in the first lines of image generation pixels and the second lines of phase difference detection pixels adjacent to the first lines are alternately arranged in the second direction to overlap each other by half a pixel.

17. The imaging apparatus according to claim 12, wherein the plurality of image generation pixels and the plurality of phase difference detection pixels are arranged in a tilted pixel arrangement.

* * * * *